(12) United States Patent
McManus et al.

(10) Patent No.: US 9,647,729 B2
(45) Date of Patent: May 9, 2017

(54) SYSTEM AND METHOD FOR DATA COLLECTION USING NEAR-FIELD MAGNETIC INDUCTION

(71) Applicant: NEAR FIELD MAGNETICS, INC., Milford, NH (US)

(72) Inventors: David F. McManus, Milford, NH (US); Jan H. Helbers, Marlborough, MA (US); Eric J. Roberts, Bedford, NH (US)

(73) Assignee: Near Field Magnetics, Inc., Milford, NH (US)

( * ) Notice: Subject to any disclaimer, the term of this patent is extended or adjusted under 35 U.S.C. 154(b) by 0 days.

(21) Appl. No.: 15/198,039

(22) Filed: Jun. 30, 2016

(65) Prior Publication Data

US 2016/0380678 A1 Dec. 29, 2016

Related U.S. Application Data

(63) Continuation-in-part of application No. 14/754,031, filed on Jun. 29, 2015.

(60) Provisional application No. 62/217,229, filed on Sep. 11, 2015.

(51) Int. Cl.
| | |
|---|---|
| *H04B 1/38* | (2015.01) |
| *H04B 1/44* | (2006.01) |
| *H04B 5/02* | (2006.01) |
| *H04B 5/00* | (2006.01) |
| *H04B 1/40* | (2015.01) |

(52) U.S. Cl.
CPC ............. *H04B 5/02* (2013.01); *H04B 1/40* (2013.01); *H04B 5/0081* (2013.01)

(58) Field of Classification Search
CPC ......................................................... H04B 5/02
USPC ..................................................... 455/73, 78
See application file for complete search history.

(56) References Cited

U.S. PATENT DOCUMENTS

| | | | | |
|---|---|---|---|---|
| 7,742,744 B2* | 6/2010 | Twitchell, Jr. | ......... | G06Q 10/08 340/10.1 |
| 7,742,745 B2* | 6/2010 | Twitchell, Jr. | ......... | G06Q 10/08 340/10.1 |
| 7,746,838 B2* | 6/2010 | Twitchell, Jr. | ......... | G06Q 10/08 340/10.1 |
| 2007/0052524 A1* | 3/2007 | Tanaka | ................. | G06K 7/0008 340/10.2 |
| 2008/0312946 A1 | 12/2008 | Valentine et al. | | |
| 2009/0121841 A1* | 5/2009 | Twitchell, Jr. | ......... | G06Q 10/08 340/10.4 |
| 2010/0219938 A1* | 9/2010 | Twitchell, Jr. | ......... | G06Q 10/08 340/10.1 |

(Continued)

*Primary Examiner* — Tilahun B Gesesse
(74) *Attorney, Agent, or Firm* — Ross Krutsinger; Mesmer & Deleault PLLC

(57) ABSTRACT

A method of collecting location data from objects moving within a specified site includes providing at least one tag reader and a plurality of tags each configured to communicate via near-field magnetic induction across an open-air gap of at least two meters. The tag reader listens for a tag signal transmitted by any one or more of the tags. Each tag transmits a tag signal containing a unique identifier that is received at a tag reader. The tag signal is demodulated to determine the unique identifier associated with the particular tag. Also disclosed is a system for monitoring a condition within a shielded environment using a tag and a tag reader that communicate using near-field magnetic induction.

16 Claims, 16 Drawing Sheets

(56) References Cited

U.S. PATENT DOCUMENTS

2012/0223819 A1   9/2012   Burgess et al.

* cited by examiner

SYSTEM AND METHOD FOR DATA COLLECTION USING NEAR-FIELD MAGNETIC INDUCTION

BACKGROUND OF THE INVENTION

1. Field of the Invention

The invention relates to data collection systems and more particularly to a system and method for collecting data using near-field magnetic induction.

2. Description of the Prior Art

Data collection and information collected about the movement and behavior of multiple attendees at a given location has become useful for various reasons. For example, data may be collected about the attendees to a convention or trade show in order to record who attends the event in general and the particular exhibits visited by the attendees. Data about the locations visited by the attendee can be used to determine an attendee's interest level in various displays, attractions, or games of chance at the event or venue.

Historically, attendee tracking has been handled in many different ways including sign-up sheets, name tags with bar codes that can be scanned, NFC-enabled devices such as cell phones or tags, and RFID communication systems using RFID tags. Based on the locations visited within the venue, the data can be used to predict future behaviors of the visitors, such as the level of attendee interest in a certain product, generating sales leads, or determining demographics and marketing strategy.

One popular method of collecting data about attendees at a venue involves the use of either barcodes, or more recently, QR codes. The barcode or QR code is printed on the attendee's name badge. When an attendee is interested, for example, in a product being displayed at a trade show, an activity at a theme park, or in a particular game of chance at a casino, a worker at the venue scans the code on the attendee's name badge and the collected data is stored for analysis or follow up.

Another method of collecting attendee data is by using transceivers that communicate with each other. For example, a first transceiver remains stationary at a specific table or booth in the venue. A second transceiver is carried by a person moving throughout the venue. As the second transceiver approaches the first transceiver, the first transceiver sends a query to the second transceiver, which in turn sends a reply containing its assigned code to the first transceiver. For the purpose of tracking attendees at an event, these systems can be used to identify the attendee at a door, station, or area of the event.

One type of tracking system utilizes radio waves to communicate between transceiver pairs. Current technologies for this type of system operate in several frequency bands including the 915 MHz, and 2.45 GHz bands. These types of systems are generally referred to as far field because the transmissions radiate into free space, where the far field region begins approximately 1/10 of a wavelength from the antenna and extends outward. Examples of such devices include, but are not limited to, cell phones, RFID tags, and tablet computers.

In contrast to far-field communication systems, some near-field communication systems use transceiver pairs that operate between 120 KHz-135 KHz. These types of systems are generally referred to as near field because transmissions are contained within a localized, non-propagating magnetic field or communication "bubble" surrounding a communication device such as a radio, headset, or microphone. This bubble generally extends less than a few feet from the antenna.

In near-field communication (NFC) systems, magnetic field energy emanates from the communication system, but does not radiate into free space as is the case in far-field transmission. Typically, near-field communication is at 13.56 MHz and has a range of no more than a few inches. In this type of system, communication occurs when one device is brought to within an inch or two of another device. For example, when an NFC-enabled device is touched to a reader, the device is activated by the reader and transmits a reply signal to the reader. This reply signal contains the attendee's information, which may be stored in a database for follow-up communication.

US patent application publication no. 20120223819A1 to Burgess discloses a NFC system used to track attendees at a trade show or other event. To overcome problems with interference, the NFC system of Burgess has a range of less than 10 centimeters. Attendees at the event have an NFC tag built into an ID card or badge. As the attendee enters and leaves a booth or station at the event, the system has a reader that communicates with the tag as the user passes the tag close to or touches it to the reader. When the attendee places the tag against the reader, for example, the system records the time in, the time out, the tag holder's identity, and the identity of the station visited. Data collection can be passive or active as long as the user places the tag within the short range of the reader.

Another method of attendee tracking involves the use of RFID tags and readers. Each attendee is issued an RFID tag that is uniquely coded to the individual. When the attendee approaches a display or game of chance, an RFID reader reads the attendee's RFID tag and stores the information. This method operates at ranges on the order of tens of feet, unlike the NFC-based systems that generally have a range of less than 10 cm. Compared to NFC systems, the increased range of RFID system does not require the attendee to manipulate or swipe the tag, making it a hands-free system.

One such RFID system is disclosed in US patent application publication no. 20080312946 to Valentine for a method of trade show data management using RFID and wireless networks such as Bluetooth®. The network is able to track a visitor's location and movement in the trade show venue by communication between the tag and the reader at periodic intervals. Inferences are drawn from the collected data about the attendee's interest in certain booths based on proximity to other attendees, interactions with other attendees, multiple visits to a certain location, and the time spent at the booth.

SUMMARY OF THE INVENTION

The above-described conventional tag/reader systems have several deficiencies. For example, devices are range limited to several centimeters (often 4 cm or less), which requires the person carrying the tag to place the tag in very close proximity to the reader. This also generally requires that the person carrying the tag actively participate in the data collection method by choosing to swipe or wave the tag close to the reader. Alternately, the person carrying the tag must happen to position himself close enough to the reader for the tag and reader to communicate. If the person carrying the tag chooses not to participate, is too lazy to swipe the tag, or just forgets to do so, data is not collected. Also, if the person carrying the tag fails to swipe the tag both at entry and upon exit, no duration information is collected for the person visiting the booth. Incomplete data is not usable in many cases.

NFC-based systems that operate at 13.56 MHz suffer from the deficiency of requiring the attendee to take action to express interest in a tradeshow booth or gaming table. The attendee must locate the NFC reader and then move the NFC-enabled device within an inch or two of the reader. Should the attendee be engrossed in the activity and forget to have the NFC device scanned, is unable to find the NFC reader, or simply wishes not to participate in the process, valuable data is lost that would allow follow-up with that attendee at a later date. NFC systems require short read ranges because they are susceptible to interference from metals, liquids, and other signals. NFC systems also do not have the ability to read multiple devices simultaneously. Significant amounts of valuable marketing data can be lost due to the limited read range and single tag reading deficiencies of this attendee tracking technology.

A deficiency of ultra-high-frequency systems (e.g., 900 MHz and above) is that they are subject to various degrees of signal interference. This interference can include interference from surrounding structures, external radio frequency interference, and interference due to weather such as rain and snow. Interference can prevent the transceiver pairs from effectively communicating with each other and again result in uncollected data or bad data. Therefore, these systems require a clear line of sight to be effective.

Due to interference problems, RFID systems require significant set-up that includes mounting an antenna, cabling the antenna back to the reader, and cabling the reader to a storage device that holds captured data. Additionally, RFID tags must be aligned properly and face the reader antenna in order to be read. Any metal in the area will block the signals or create multipath situations where received data will be corrupted. The use of unrestricted and unlimited numbers of readers is not possible due to reader-to-reader interference. This type of system requires significant forethought and coordination with all exhibitors or gaming areas to ensure no overlap of reader signals. These deficiencies typically result in significant amounts of uncollected data, advanced planning to avoid interference issues, and lengthy set-up times. Accordingly, the benefit often does not justify the cost.

It is not easy to create a system in which multiple, arbitrarily positioned, and arbitrarily oriented attendee tags move relative to a fixed tag reader. Some systems have overcome this issue by requiring a close coupling of the tag reader and the tags in a controlled geometric manner or by limiting the read point to one tag at a time. These restrictions limit the number of applications where automatic data collection can be applied and also require manipulative action by the user.

Another deficiency of some prior-art systems is that the tag reader cannot simultaneously transmit and receive signals. In many prior-art antennas, the transmit coil and the receive coil are the same coil. In such a system with only one coil, a transmit/receive switch switches between the transmitter and the receiver depending on the state of the transceiver. Therefore, simultaneous transmitting and receiving is not possible.

Prior-art systems fail to reduce coupling between collocated transmit and receive antennas while also maximizing signal range. In contrast to these prior-art systems, antennas of the present invention eliminate the coupling of the transmit signal into the receiver when the transmit coil and the receive coil are collocated on parallel planes or on a single plane. For example, by placing one or more receive coils inside the closed geometry of the transmit coil, placing one or more receive coils outside of the closed geometry of the transmit coil, and connecting all of the receive coils in series, the transmit signal is eliminated or sufficiently reduced from the receiver. Since the transmit signal voltages received by the inner and outer receive coils are 180 degrees out of phase, the sum of these signals in the inner and outer receive coils cancel each other. The sum of the areas enclosed by the turns of the inner receive coil (also known as the turns-area product) must equal the sum of the areas enclosed by the outer coils in order to achieve complete phase cancellation of transmit signals in the inner and outer receive coils. If these turns-area products are not equal, phase cancellation reduces, rather than fully eliminates, the local or collocated transmit signal to the receiver.

For the same reason, when an external signal impinges on the inner and outer receive coils of antennas of the present invention, the signals of the inner and outer receive coils are in phase. As a result, the signals impinging on the inner and outer receive coils add, thereby increasing the receiver sensitivity of the system and allowing for an increased range of near-field magnetic communication. This antenna structure also obviates the need for a transmit/receive switch and all of its complexity. Additionally, one could transmit and receive continuously at the same time using the same frequency or using different frequencies.

Unlike the attendee tracking methods and systems of the prior art, the present invention provides an improved attendee tracking or data collection system that includes attendee tags and readers that operate with a low-frequency (100 KHz-300 KHz) non-propagating magnetic field. System operation at low frequency allows the system to work volumetrically (i.e. a tag enters a volume of space where a reader is interrogating) instead of line-of-sight and around metals and liquids.

Additionally, embodiments of the data collection system of the present invention provide a reader with an antenna that allows signal transmission and reception concurrently in the three spatial planes as well as transmitting and receiving simultaneously at the same frequency or at different frequencies. This antenna feature allows the attendee tag to be oriented in any direction relative to the tag reader and still communicate effectively with the tag reader.

Further, tag readers of the present invention can be adjusted to operate at distances from a few inches up to 15 feet using, but not limited to, knobs, buttons, or software. This allows fine tuning of the area being monitored for attendee tags by a tag reader and allows for better data collection as to the exact location or display of particular interest to the attendee.

Still further, embodiments of the present invention with passive tags require only the tag reader to be powered for the system to operate. Such a tag reader needs no further set-up or cabling. In systems of the present invention, the setup typically only involves plugging the reader into a standard electrical outlet and then setting it down in a desired location, such as beneath a display counter.

Still further, the improved data collection system of the present invention uses error correction codes, timing delays, and other means to allow the reader to see multiple attendee tags in its volumetric magnetic field. The fields from multiple tag readers can also overlap with no impact on the system's ability to operate.

Still further, in situations where multiple, overlapping tag readers communicate with a single attendee tag, the reader that is closest to the attendee tag can be determined using a received power measurement that is easily performed in the tag reader, thereby allowing better parsing of the data to determine which location the attendee was actually viewing or visiting.

Still further, attendee tags of the system can be passive or active depending on the desired maximum range. Passive tags can be used for shorter distances of up to a few feet while active, battery powered, tags can be used for longer ranges of up to 15 feet or more.

Finally, the improved data collection system allows for data to be stored on a local reader storage device such as a flash card, or hard disk drive, or be transmitted to a central data base server using any of many standard networking protocols either wirelessly or wired.

One aspect of the present invention is directed to a system for collecting data about objects moving within a specified site. The system includes at least one tag reader disposed within a specified site and configured to transmit a magnetic field to an interrogation area within the specified site and extending at least two meters across an open-air gap. Each tag reader has a transceiver antenna comprising a first antenna coil disposed on a planar substrate and substantially defining a first coil closed geometry with an innermost first coil turn and an outermost first coil turn. At least one second antenna coil is disposed on the planar substrate within the innermost first coil turn. Each second antenna coil has a plurality of second coil turns each substantially defining a closed second coil geometry, where each second antenna coil defines an effective second coil area. At least one third antenna coil is disposed on the planar substrate outside of the outermost first coil turn and having a plurality of third coil turns substantially defining a closed third coil geometry, where each third antenna coil has an effective third antenna coil area. The third antenna coil(s) is (are) connected in series with the second antenna coil(s), where the effective third antenna coil area differs from the effective second coil area by no more than 5%, thereby resulting in at least 95% phase cancellation between a second voltage induced in the at least one second antenna coil and a third voltage induced in the at least one third antenna coil when conducting a current through the first antenna coil. The system also includes a plurality of tags configured to wirelessly communicate with the tag reader(s) via near-field magnetic induction across an open air gap of at least 2 meters. Each of the tags is constructed to be carried by an object moving within the specified site. When located within an interrogation area, each of the tags is configured to wirelessly communicate a unique identifier to the respective tag reader via near-field magnetic induction.

In one embodiment, the first antenna coil is a transmitter antenna. The second antenna coil(s) and the third antenna coil(s) comprise a receiver antenna.

In another embodiment, the first antenna coil is a receiver antenna. The second antenna coil(s) and the third antenna coil(s) comprise a transmitter antenna.

In some embodiments, the effective third antenna coil area differs from the effective second coil area by no more than 1%, thereby resulting in at least 99% phase cancellation between the second voltage induced in the at least one second antenna coil and the third voltage induced in the at least one third antenna coil when conducting the current through the first antenna coil.

In another embodiment, the transceiver antenna is configured as a focused-beam directional antenna constructed and arranged to direct the magnetic field within a particular angular region to define the interrogation area.

In another embodiment, the magnetic induction has a frequency from 100 KHz to 300 KHz.

In another embodiment, each tag reader is configured to transmit and receive at the same time.

Another aspect of the invention is directed to a method of collecting location data from objects moving within a specified site. In one embodiment, the method includes the steps of providing at least one tag reader with a tag reader antenna configured to receive signals via near-field magnetic induction across an open-air gap of at least two meters; providing a plurality of tags configured to wirelessly communicate with the tag readers via near-field magnetic induction across an open air gap of at least 2 meters; each tag reader listening for the tag signal transmitted by any one or more tags; each of the plurality of tags transmitting a tag signal containing a unique identifier; receiving a tag signal from a particular tag at the at least one tag reader; demodulating the tag signal from the particular tag to determine the unique identifier associated with the particular tag; and saving the unique identifier.

In one embodiment, the providing step includes selecting the tag reader with the tag reader antenna configured as a transceiver antenna capable of transmitting and receiving at the same time.

In another embodiment, the tag signal comprises a plurality of tag signals separated in time by a constant tag signal interval. In one embodiment, the tag signals are separated in time by a varying tag signal interval. In some embodiments, the tag signal interval is adjustable or programmable by a user.

In some embodiments, the magnetic induction has a frequency from 100 KHz to 300 KHz.

In another embodiment, the method also includes the steps of selecting the at least one tag reader to transmit a magnetic field to an interrogation area extending across an open-air gap of at least two meters; the at least one tag reader transmitting the magnetic field to the interrogation area; and at least one of the plurality of tags receiving the magnetic field.

In another embodiment, the tag reader antenna is configured as a directional antenna and the interrogation area is substantially constrained to a specific angular region.

In another embodiment, the method includes equipping at least one object with one of the plurality of tags.

In another embodiment, the tag periodically transmits a signal to (e.g., "pings") a passive receiver. In this embodiment, the reader does not interrogate, but instead listens for signals transmitted by one or more tags across an open air gap of at least 2 meters. For example, each attendee tag transmits a tag signal at predefined intervals, where the tag signal contains a unique identifier. Each tag reader listens for tag signals transmitted by any of the attendee tags. After receiving a tag signal from a particular attendee tag, the signal is demodulated to determine the unique identifier associated with the particular attendee tag. The unique identifier may then be saved by the system.

Another aspect of the present invention is directed to a method of monitoring an enclosed environment. The method includes the steps of disposing a sensor inside an environment enclosed by an enclosure made of metal; disposing a transmitter inside the environment, where the transmitter configured to communicate using near-field magnetic induction; coupling the sensor to the transmitter; disposing a receiver outside the enclosure, where the receiver configured to communicate with the transmitter using near-field magnetic induction; coupling the receiver to a communications device outside of the enclosed environment; wirelessly communicating a sensed condition of the enclosed environment from the transmitter to the receiver using near-field magnetic induction; and communicating the sensed condition to an user using the communications device.

In one embodiment, the communications device is selected as a computer, a display panel, a wireless network, or a cabled network.

In one embodiment, the enclosure is selected as a refrigerator, a freezer, an oven, a liquid-storage tank, a cargo trailer, or a cargo container.

DETAILED DESCRIPTION

Embodiments of the present invention are illustrated in FIGS. 1-17.

Figure 1:
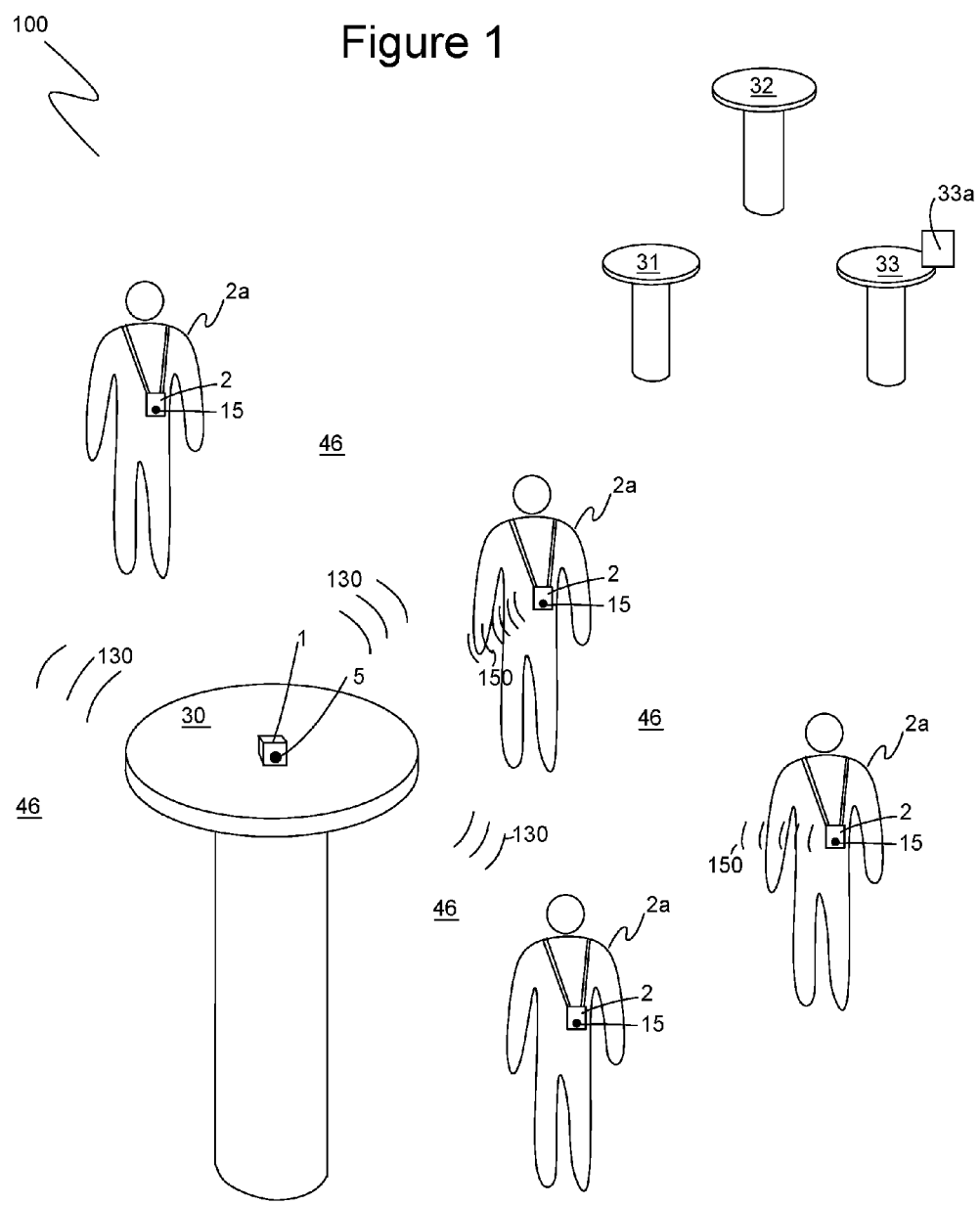
FIG. 1 is a diagram showing components of a system for collecting attendee data at an event.

Referring to FIG. 1, one embodiment of the current invention is directed to a system 100 for collecting data about objects 2a moving within a specified site. Object 2a may be a person, animal, package, suitcase, or other item of interest. For example, objects 2a are attendees moving about an event held at the specified site or venue. The specified site can be a room, building, town, or other area.

System 100 includes a plurality of uniquely-coded tags 2 (also referred to as attendee tags 2 in some embodiments) assigned and distributed to each object 2a. For example, when system is configured for attendees at an event, each object 2a (i.e., attendee) is assigned an attendee tag 2 during event registration, where the attendee tag 2 is coded with a unique identifier. Optionally, the attendee tag 2 contains the attendee's name, company name, contact information, and the like. In another example, when system 100 is used to track animals or inanimate objects 2a, tag 2 may contain the identity/name, owner's name, inventory number, or other relevant information.

System 100 also has one or more tag readers 1 placed at a location 30 within the specified site, such as an event exhibit, a tradeshow booth within an exhibit hall. Each tag reader 1 is positioned to collect data about objects 2a. For example, system 100 collects the unique identifier of each attendee tag 2 that visited booth 30 or any of booths 31, 32, 33, the length of visit for each attendee tag 2, and the number of return visits (if any) by attendee tag 2. System 100 may also be used to monitor visits to a specific location 30 such as, for example, when object 2a is a person visiting a particular display 33a at booth 33 of a trade show. The unique identifier of each attendee tag 2 may correspond to the identity of the object 2a holding the attendee tag 2. This information can be used to develop sales leads and marketing strategy. In other embodiments where system 100 configured for tracking animals or inanimate objects, the collected information may be used, for example, to confirm the location of each object 2 along a journey, assembly line, delivery route, process, or the like.

In one embodiment, tag reader 1 has a tag reader antenna 5 with three transceivers set-up orthogonally to each other in an X-Y-Z orientation. This arrangement of tag reader antenna 5 is a magnetic flux antenna that can receive tag signals 150 from any direction. Optionally, where the direction of the magnetic field 130 of tag reader 1 needs to be directed to a specific space or region, tag reader 1 may have paramagnetic or ferromagnetic materials used to direct the shape or direction of magnetic field 130 as is discussed in more detail below.

As also discussed in more detail below, one embodiment of system 100 has tag reader antennas 5 with transmit and receive coils located in the same or parallel planes. This antenna design permits tag reader antenna 5 to transmit and receive at the same time, which is unlike traditional transceiver antennas that alternate between receive and transmit. By configuring the tag reader antenna 5 to transmit and receive at the same time, in addition to modulating interrogation field 46, system 100 is configured to continuously interrogate. As a result, system 100 can see multiple tags 2 at one time in interrogation field 46 because the various tags 2 each periscope at different times based on when they were started and the set length of time between each periscope. Unlike traditional transceivers, tag reader 1 does not need to shut down the interrogation field 46 (transmit) to listen for responses from the tags 2 (receive).

In one embodiment, tag reader 1 modulates the interrogation field 46 so that tags 2 distinguish the interrogation field 46 from random noise. Each tag 2 recognizes the modulated signal and determines that the tag 2 can communicate with tag reader 1, as opposed to receiving random noise. For example, the tag reader 1 has a transmitter circuit and a receiver circuit that operate somewhere between 100 KHz and 300 KHz. Tag reader 1 uses active filtering in the receiver to reject out-of-band signals that could corrupt the response signal of tag 2. In some embodiments, tag reader 1 also uses bit error correction algorithms to recover corrupted tag information whenever possible. When tag 2 detects a reader interrogation field 46, tag 2 will respond by transmitting reply data to tag reader 1.

In one embodiment, tag 2 has a directional tag antenna 15 to increase its range. In other embodiments, tag antenna 15 is omnidirectional. For example, the tag antenna 15 is a coil wrapped around a piece of high-permeability ferrite or other high-permeability material. Tag 2 may be either passive or active. For example, a passive tag 2 within interrogation field 46 has a capacitor that is charged by interrogation field 46. In response to interrogation field 46, tag 2 transmits its ID number to tag reader 1.

When tag 2 is an active tag, for example, it periscopes at a predetermined interval. In one embodiment, the interval is from thirty seconds to sixty seconds; in other embodiments, the interval is one to two seconds. Interval length may be chosen depending on the desired detail of information collected. At each periscope, tag 2 listens for a signal from interrogation field 46. If tag 2 does not detect a reader interrogation field, it will go back to sleep and periscope at the next appointed interval. If tag 2 detects or "hears" a signal in a reader interrogation field 46, it will respond by transmitting its unique ID, go back to sleep, and then periscope again at the next appointed interval. In one embodiment, periscoping in active tag 2 is accomplished using a processor watchdog timer that helps preserve the battery life. In some embodiments, the time between periscopes or transmissions from each tag 2 is spaced by a fixed, variable, or random length of time. In some embodiments, the length of time is adjustable and/or programmable by the user.

In some embodiments, the active tag 2 has a tone detector circuit used to determine if it is in a reader interrogation field 46. Based on detecting an identifiable tone sequence while in reader interrogation field 46, the tone detector circuit will wake up tag 2 and then transmit the unique tag ID.

In other embodiments, tags 2 are active and tag reader 1 is passive, where active tags 2 transmit a signal periodically (i.e., ping) to tag reader(s) 1. In such an embodiment, tag reader 1 listens for pings from the active tags 2 that are within range and records the tag information after receiving a ping.

Figure 2:
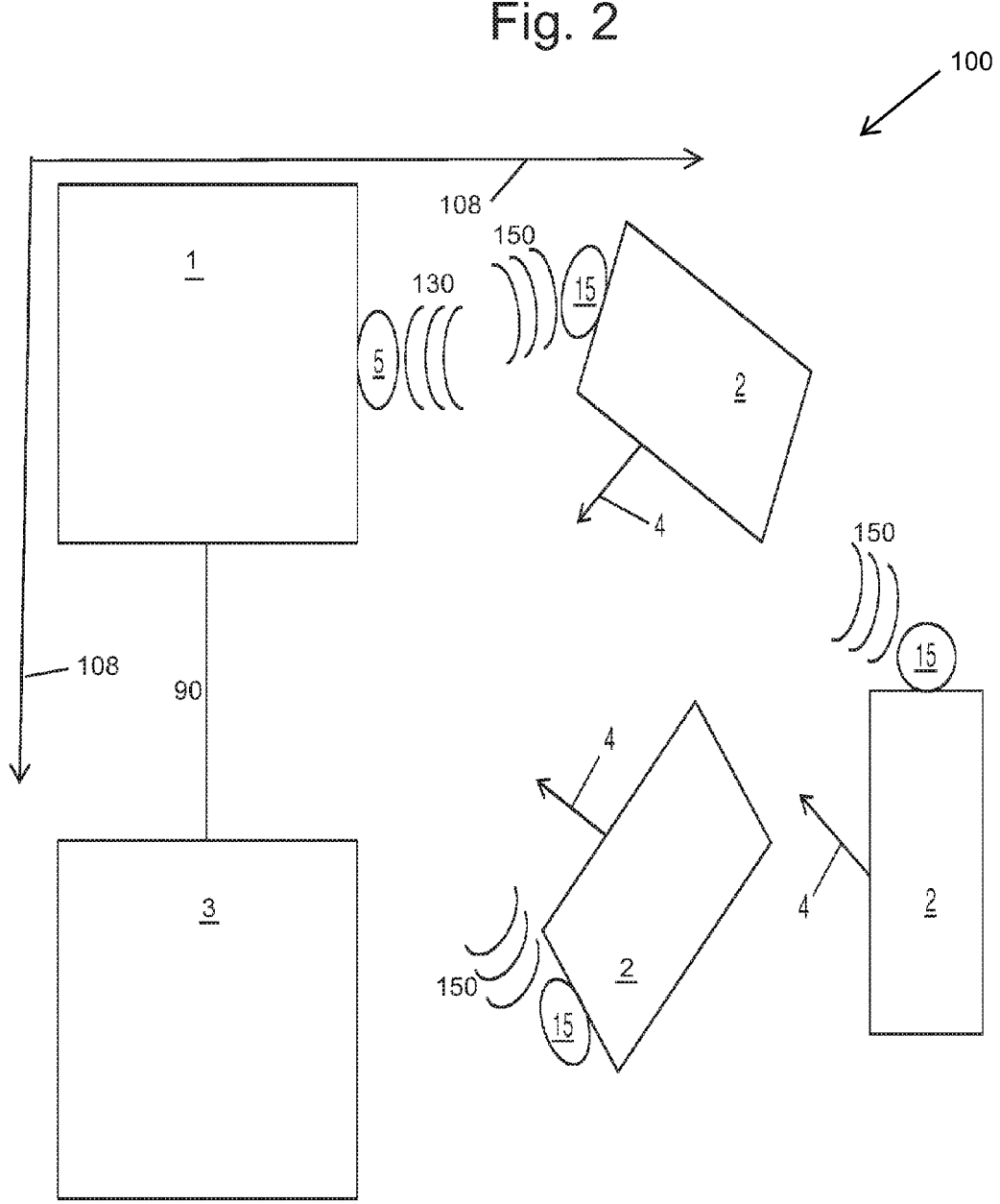
FIG. 2 is a block diagram of an embodiment of a system of the present invention.

FIG. 2 illustrates an embodiment of system 100 that includes a tag reader 1 and one or more tags 2. Each tag 2 has a tag antenna 15. Each tag reader 1 has at least one tag reader antenna 5. As discussed in more detail below, one embodiment of tag reader antenna 5 includes a first reader antenna oriented in an X plane, a second reader antenna oriented in a Y plane, and a third reader antenna oriented in a Z plane. In one embodiment discussed further with reference to FIG. 8, each transceiver of tag reader antenna 5 has an inner receive coil 510, one or more transmit coils 520, and one or more outer receive coils 530, where the transmit and receive coils 510, 520, 530 are coplanar or on parallel planes and where signals received by the inner and outer receive coils 510, 530 from the transmit coil 520 substantially cancel each other due to phase cancellation.

Optionally, each tag 2 is configured to be moved with respect to tag reader 1 at a variety of different velocities represented by velocity vectors 4. In some embodiments of system 100, the direction in which tags 2 approach tag reader 1 is significant. For example, a trade show exhibit 30 (shown in FIG. 1) that backs up to an aisle is close enough to objects 2a (shown in FIG. 1) walking in the aisle such that the tags 2 of these objects 2a communicates undesirably with a tag reader 1 in that booth 30. As a result, objects 2a merely walking in the aisle behind the booth 30, but who do not visit or see its contents, could be erroneously recorded as visitors to the booth 30. Thus, by directing magnetic energy 130 into a specific region 108, tag reader 1 correctly and effectively communicates with tags 2 at the booth 30 without constraining the distance between tag reader 1 and tags 2. Accordingly, system 100 may be configured to direct magnetic energy 130 into a specific angular region 108, while also directing that same magnetic energy 130 in a plurality of orientations with respect to multiple tags 2 and tag reader 1.

In response to magnetic energy 130 of tag reader 1, tag 2 responds with a reply signal 150. After tag reader 1 demodulates a reply signal 150 from tag 2, tag reader 1 transmits a signal 90 to data storage device 3 where signal 90 contains a unique identifier corresponding to a particular tag 2. Data storage device 3 records the unique identifier as well as location and time data for the tag 2.

Tag reader 1 is optionally coupled to data storage device 3, such as for storage and management of collected data. In some embodiments, data storage device 3 is integrated with tag reader 1 into a single unit so that data is not lost if the communications network fails. In other embodiments, data storage device 3 is a separate unit coupled to tag reader 1 by wires or wireless communication. Data storage device 3 may be one of many devices known in the art and include computer hard drives, memory sticks, computers, and the like.

Figure 3:
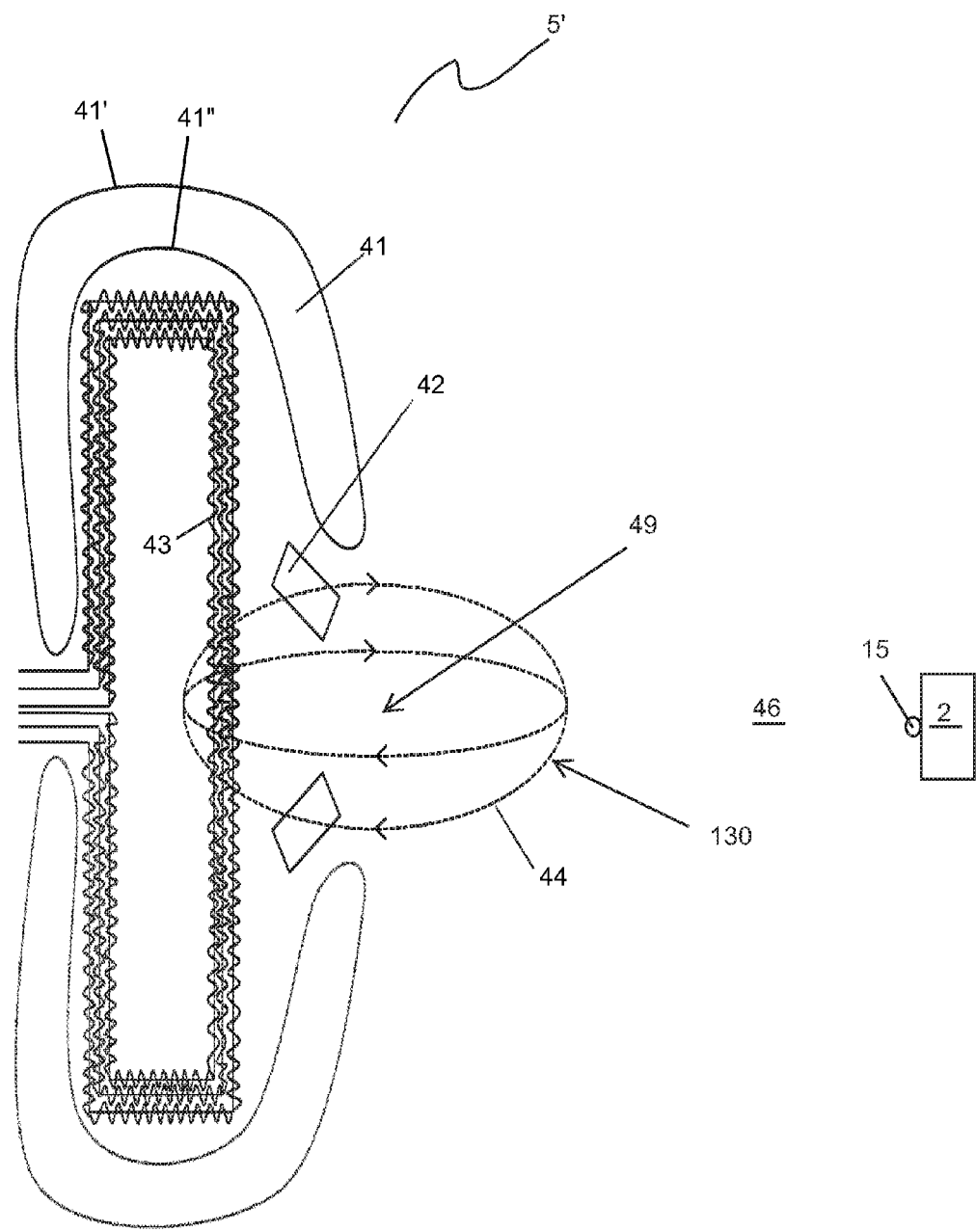
FIG. 3 is a block diagram of a magnetic flux antenna component of the system of FIG. 1.

FIG. 3 shows a cross-section of one embodiment of tag reader antenna 5 (shown in FIG. 1) that is configured as a directional magnetic flux antenna 5'. Directional magnetic flux antenna 5' includes electromagnetic windings 43, a paramagnetic housing 41, and one or more ferromagnetic elements 42 to direct a magnetic field 130 in a particular direction over an extended distance. Housing 41 and ferromagnetic elements 42 direct a magnetic field 130 across an open-air gap of interrogation field 46 between tag reader 1 and tags 2 (shown in FIG. 1). Being an open-air gap, interrogation field 46 may be as small as 1 cm or as large as 5 meters or more. In one embodiment, interrogation field 46 is up to 5 meters, and may operate within a specific range, such as a range of 2 to 5 meters.

Directional magnetic flux antenna 5' both focuses magnetic flux during transmit and receives flux about multiple rotational orientations. When transmitting, antenna flux lines of magnetic field 130 are focused as shown in FIG. 3 along one side of magnetic flux antenna 5'. This effect occurs due to the use of paramagnetic and ferromagnetic materials (e.g. housing 41 and elements 42, respectively) arranged about multiple windings 43. The combination of paramagnetic housing 41, ferromagnetic elements 42, and windings 43 creates a magnetic circuit. The magnetic circuit concentrates magnetic flux lines 44 within paramagnetic housing 41 and ferromagnetic materials 42, as well as directing a concentration of flux lines 44 across open-air gap of interrogation field 46 to a point in space that is external to magnetic flux antenna 5'. The shape of magnetic field 130 is a function of the placement of paramagnetic housing 41, ferromagnetic elements 42, and electromagnetic windings 43. By adjusting the spacing and orientation of these components, tag reader antenna 5 (shown in FIG. 1) may be configured to function as a focused-beam antenna. Magnetic flux antenna 5' may optionally omit paramagnetic housing 41 and ferromagnetic elements 42 to provide an omnidirectional magnetic flux antenna.

In one embodiment, housing 41 is constructed of mu-metal or equivalent paramagnetic material. Mu-metal is a nickel-iron alloy with high permeability and effective screening of low-frequency magnetic fields. Housing 41 preferably has an inner sphere 41" within an outer sphere 41', where spheres 41', 41" of housing 41 are separated by a distance of approximately 5-15 mm. An opening 49 is located at one pole of housing 41. Coil windings 43 are located within the inner sphere 41". Ferromagnetic elements 42 are placed in inner sphere 41" to shape magnetic field 130 and focus the magnetic field 130 to a target. Ferromagnetic elements 42 may be mu-metal or other ferromagnetic material. Magnetic flux antenna 5' may have various other shapes, including flat panels and rectangular boxes with an open side. Tag 2 preferably has tag antenna 15 configured as an omni-directional antenna, but tag antenna 15 optionally is configured as a directional magnetic flux antenna similar to as described above for tag reader 1.

Figure 4:
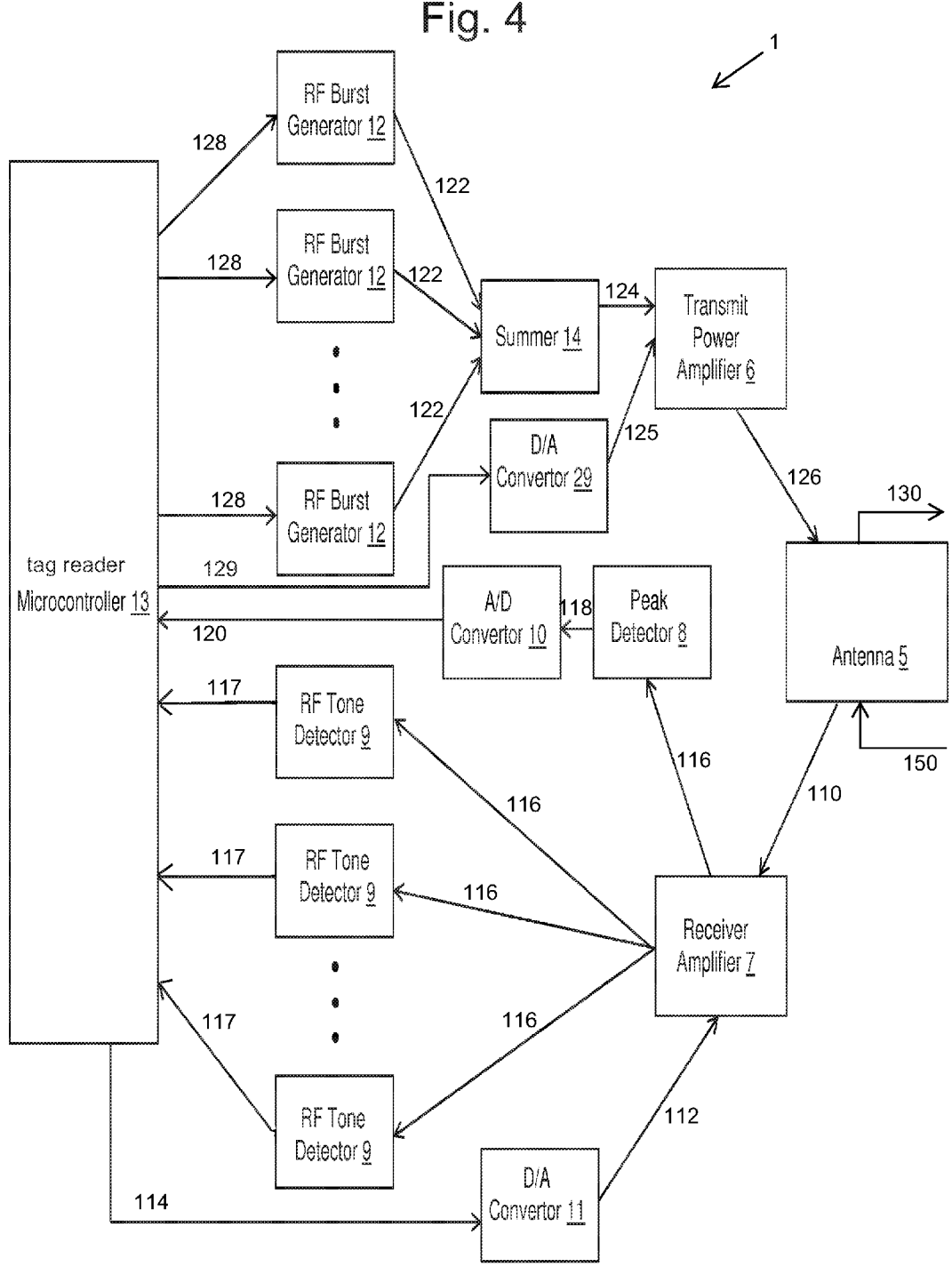
FIG. 4 is a block diagram of a tag reader component of the system of FIG. 1.

FIG. 4 illustrates the internal functional blocks of an embodiment of tag reader 1. Tag reader 1 includes tag reader antenna 5, a transmit power amplifier 6, a receiver amplifier 7, a peak detector 8, one or more RF tone detectors 9, an analog to digital converter 10, a digital to analog converter 11, one or more RF burst generators 12 (i.e., modulators), a tag reader microcontroller 13, a summer 14, and a digital to analog converter 29. In one embodiment, tag reader antenna 5 is a focused-beam magnetic flux antenna.

Tag reader antenna 5 is electrically coupled with transmit power amplifier 6 and receiver amplifier 7. Transmit power amplifier 6 is additionally electrically coupled with D/A converter 29, and summer 14. D/A converter 29 is also electrically coupled with tag reader microcontroller 13, which receives control signal 129 to adjust the gain of transmit power amplifier 6. Summer 14 is additionally electrically coupled with the plurality of RF burst generators 12. Each RF burst generator is also electrically coupled with tag reader microcontroller 13.

Receiver amplifier 7 is also electrically coupled with peak detector 8, D/A converter 11, and each RF tone detector 9. Peak detector 8 is additionally electrically coupled with A/D converter 10, which is electrically coupled with tag reader microcontroller 13. Each RF tone detector 9 is electrically coupled with tag reader microcontroller 13 and with receiver amplifier 7. D/A converter 11 is electrically coupled with tag reader microcontroller 13.

Receiver amplifier 7 has a gain value that is determined by the strength of tag signal 150 impinging on tag reader antenna 5. Tag reader antenna 5 communicates received signal 110 to receiver amplifier 7. Receiver amplifier 7 has multiple gain stages set by a programmable voltage value 114 from tag reader microcontroller 13 and converted to an analog voltage 112 by DA converter 11. Peak detector 8 sends detected peak value 118 to A/D converter 10, which converts peak value 118 to a digital peak value 120. Using digital peak value 120 to estimate the amplitude of tag signal 150 impinging on tag reader antenna 5, software calculations of microcontroller 13 determine the value of each stage's gain. Amplified signal 116 from receiver amplifier 7 is also input to a plurality of RF tone detectors 9. Tone detector 9 demodulate signal 116 to provide an RF tone 117 value of 1, 0, or a symbol. For example, a tone frequency of 122 KHz is demodulated by tone detector 9 to yield a value of 1; a tone frequency of 127 KHz is demodulated by tone detector 9 to yield a value of 0. Data or identification values are a combination of the 1s and 0s in RF tones 117 received at tag reader microcontroller 13.

Protocol firmware within tag reader microcontroller 13 monitors the power at each stage and increases or decreases attenuation to maintain the power level within a prescribed predefined range. The range is based on the sensitivity of the chosen components of system 100 (shown in FIG. 1). By averaging the power levels at each stage with an averaging algorithm, the software of microcontroller 13 also provides a more even response of system 100. Power monitoring and averaging calculations are performed in real time as the distance changes between tags 2 and tag reader 1 within interrogation field 46.

Firmware within tag reader microcontroller 13 sends signal 128 that enables a particular RF burst generator 12 to generate RF burst signals 122. RF burst generators 12 are toggled on and off by signal 128 from microcontroller 13. Each RF burst signal 122 is input to summer 14 and the summed RF burst signal 124 is transmitted to power amplifier 6. In one embodiment, RF burst signal 122 is a sine wave with a frequency that corresponds to a value of 1, 0, or a symbol. Transmit power amplifier 6 transforms RF signal burst into a drive current 126 that is conducted through tag reader antenna 5. Drive current 126 is preferably on the order of several amperes, but the value of drive current 126 may differ depending on the current that system 100 (shown in FIG. 1) is designed to use. Additionally, D/A converter 29 provides gain control signal 125 to transmit power amplifier 6 to adjust the range of tag reader 1. Tag reader 1 transmits an RF signal 130 that impinges on tag antenna 15 of tags 2 (discussed below). RF signal of magnetic field 130 has a particular modulation scheme and data structure that is unique to tag reader 1. In one embodiment, Amplitude Shift Keying (ASK) is used to provide a modulation scheme for magnetic field 130 that varies the amplitude. Other modulation schemes can be used that vary the amplitude, frequency, phase, or any combination of these.

Figure 5:
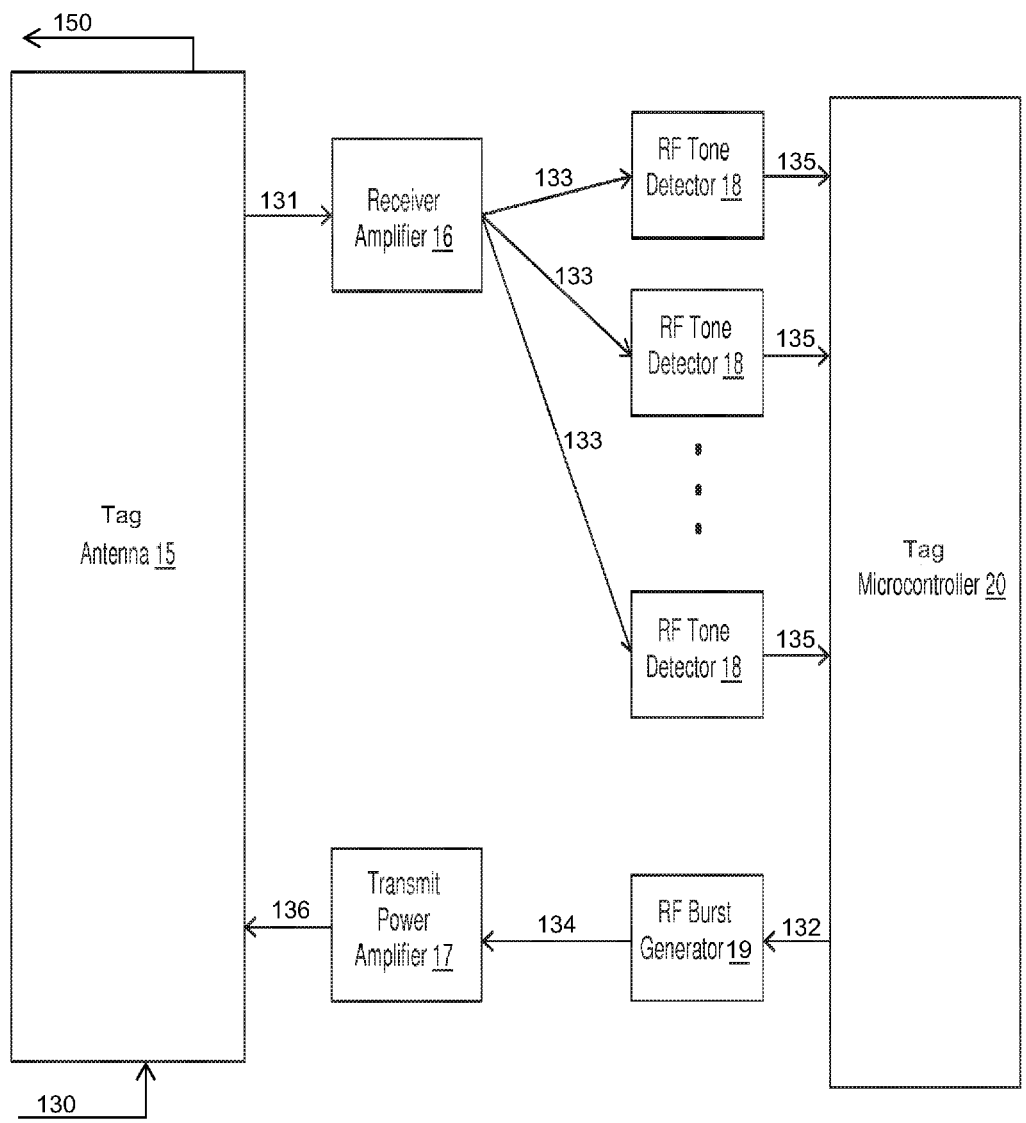
FIG. 5 is a block diagram of an attendee tag of the system of FIG. 1.

FIG. 5 illustrates the internal functional blocks of an embodiment of tag 2. Tag 2 includes a tag antenna 15, a receiver amplifier 16, a transmit power amplifier 17, one or more RF tone detectors 18, an RF burst generator 19 (i.e., modulator), and a tag microcontroller 20. In each tag 2, tag antenna 15 is preferably an omnidirectional magnetic flux antenna. In some embodiments, tag antenna 15 is a directional magnetic flux antenna as described above for tag reader antenna 5 (shown in FIG. 1).

Tag antenna 15 is electrically coupled with receiver amplifier 16 and transmit power amplifier 17. Receiver amplifier 16 is additionally electrically coupled with RF tone detectors 18, which are each additionally electrically coupled with tag microcontroller 20. Transmit power amplifier 17 is disposed in communication with RF burst generator 19, which is additionally disposed in communication with tag microcontroller 20.

RF signal of magnetic field 130 impinges on tag antenna 15 and a RF signal 131 is communicated to receiver amplifier 16. Receiver amplifier 16 sends amplified signal 133 to each tone detector 18 for demodulation. Each tone detector 18 sends detected tones 135 to tag microcontroller 20. Tag 2 reacts by powering on when tag microcontroller 20 detects a particular RF signal. Tag microcontroller 20 then generates a serial data stream 132. RF burst generator 19 receives the serial data stream 132 from tag microcontroller 20. Serial data stream 132 from tag microcontroller 20 toggles RF burst generator 19 on and off. RF signal 134 from RF burst generator 19 (e.g., a sine wave) is passed to transmit power amplifier 17 and has a frequency that corresponds to a value of 1, 0 or a symbol. RF signal 134 is converted to a current 136 by transmit power amplifier 17 and driven through tag antenna 15 to transmit tag signal 150 to tag reader 1.

Each tag 2 detects a particular frequency of magnetic field 130 transmitted by tag reader antenna 5 (shown in FIG. 1). The frequency of magnetic field 130 is between 100 KHz and 300 KHz in one embodiment. Upon detection of frequency of magnetic field 130, tag 2 powers up. Tag 2 then replies to tag reader 1 by transmitting a tag signal 150 with a tone burst of magnetic energy. This tag signal 150 impinges upon tag reader antenna 5.

In one embodiment, tag 2 is a key fob that may be identified using a sequence of numbers in burst signal 134. In another embodiment, tag 2 is a smart card, badge, or other portable device that is communication-operable with near-field magnetic inductance. In another embodiment, tag 2 has only a transmitter section and transmits its information at predefined or random intervals.

Figure 6:
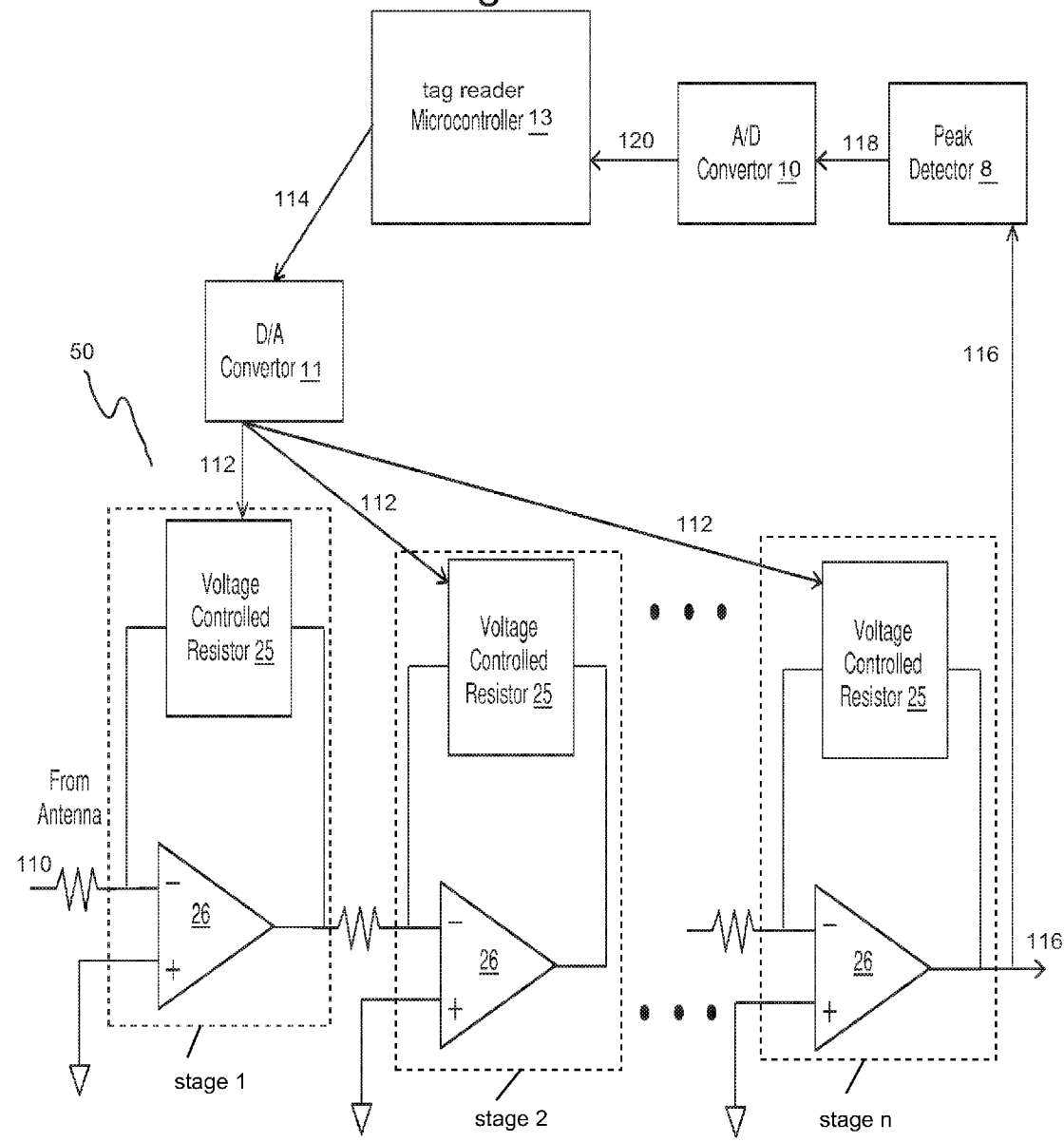
FIG. 6 is a block diagram of an embodiment of an adjustable gain amplifier component as included in the embodiment of the tag reader of FIG. 4 and the attendee tag of FIG. 5.

FIG. 6 shows one embodiment of receiver amplifier 7 (shown in FIG. 4) configured as an adjustable gain amplifier 50 for received signal 110. Adjustable gain amplifier 50 is described here as it may be used in tag reader 1 (shown in FIG. 1); however, adjustable gain amplifier 50 may be used as amplifier 7 of tag reader 1 and/or receiver amplifier 16 (shown in FIG. 5) of tags 2 and corresponding peak detector, A/D converter, D/A converter, and microcontroller. As used in the embodiment of tag reader 1 shown in FIG. 4, adjustable gain amplifier 50 has at least one stage (i.e., stage 1, stage 2, . . . , stage n), each stage having one or more voltage controlled resistors 25 and one or more operational amplifiers 26. Adjustable gain amplifier 50 is electrically coupled to tag reader microcontroller 13, digital to analog converter 11, peak detector 8, and analog to digital converter 10. Gain is adjusted by the control of the tag reader microcontroller 13 using intelligence embodied in software in tag reader microcontroller 13. Gain is adjusted dynamically via the voltage controlled resistors 25 coupled at each operational amplifier 26 (i.e., gain stage). It is contemplated that voltage-controlled resistors 25 may be placed at any point in the operational amplifier's feedback path. Any of amplifiers 6, 7, 16, 17 (shown in FIGS. 4 and 5) may comprise multiple gain stages (i.e., stage 1, stage 2, . . . , stage n) as illustrated in FIG. 6.

For example, receiver amplifier 7 of the tag reader 1 shown in FIG. 4 is configured as adjustable gain amplifier 50. In this embodiment, tag reader microcontroller 13 sends signal 114 to digital to analog (D/A) converter 11. Based on signal 114 received by D/A converter 11, D/A converter 11 sends voltage 112 to each of voltage-controlled resistors 25. Voltage 112 determines the resistance and therefore the gain of each amplifier stage (i.e., stage 1, stage 2, . . . , stage n). Voltage settings are retained over time within tag reader microcontroller 13. Output signal 116 from final stage (stage n) of adjustable gain amplifier 50 is sent to peak detector 8, which measures and sends peak amplitude value 118 to analog to digital (A/D) converter 10. Digital value 120 is sent to the tag reader microcontroller 13. The software of tag reader microcontroller 13, with knowledge of the voltage controlled resistor 25 settings and the output peak amplitude value 118, adjusts voltage controlled resistor 25 setting to maintain the output voltage 112 from D/A converter 11 to be within the range of operational amplifiers 26.

Figure 7:
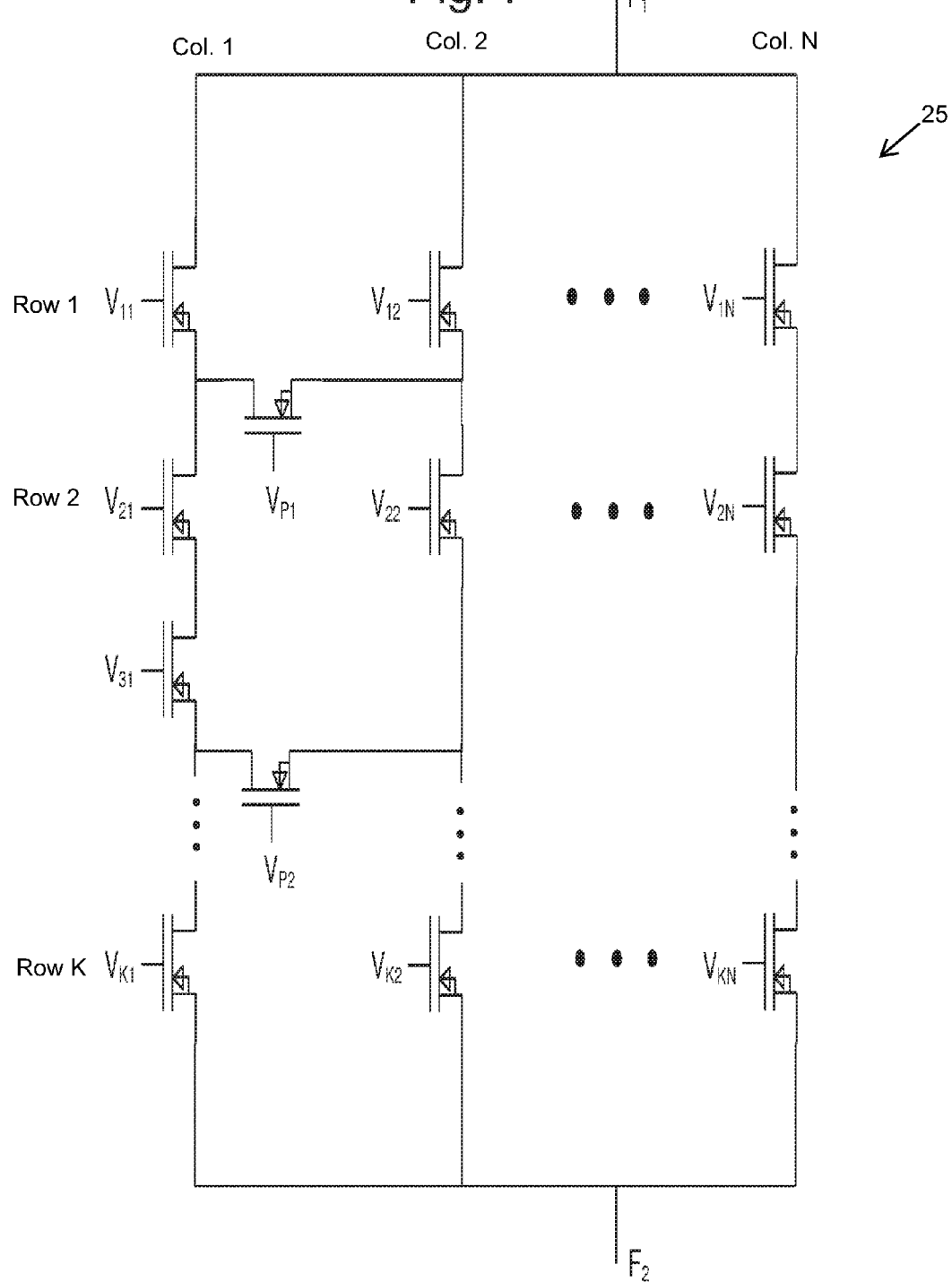
FIG. 7 is a circuit diagram of a voltage controlled resistor component of one embodiment of the adjustable gain amplifier of FIG. 6.

FIG. 7 shows an implementation of voltage controlled resistor 25 that enables tag reader microcontroller 13 to control a gain stage as shown in FIG. 6. An arrangement of field effect transistors (FETs) enables the resistance between nodes $F_1$ and $F_2$ to be set over a wider range than possible with a single field effect device. Specifically, the resistance range is increased by the combination of FET series resistances in each of columns Col. 1, Col. 2, . . . , Col. N along each of rows Row 1, Row 2, . . . , Row K. The adjustment of the resistance value occurs with the use of cross-column FETs. Tag reader microcontroller 13 software or firmware calculates the voltage values of $V_{11}$ through $V_{KN}$, as well as peak $V_{KN}$. With this arrangement, resistance between node $F_1$ and $F_2$ is precisely adjusted across a wide range of voltage values across nodes $F_1$ and $F_2$.

Figure 8:
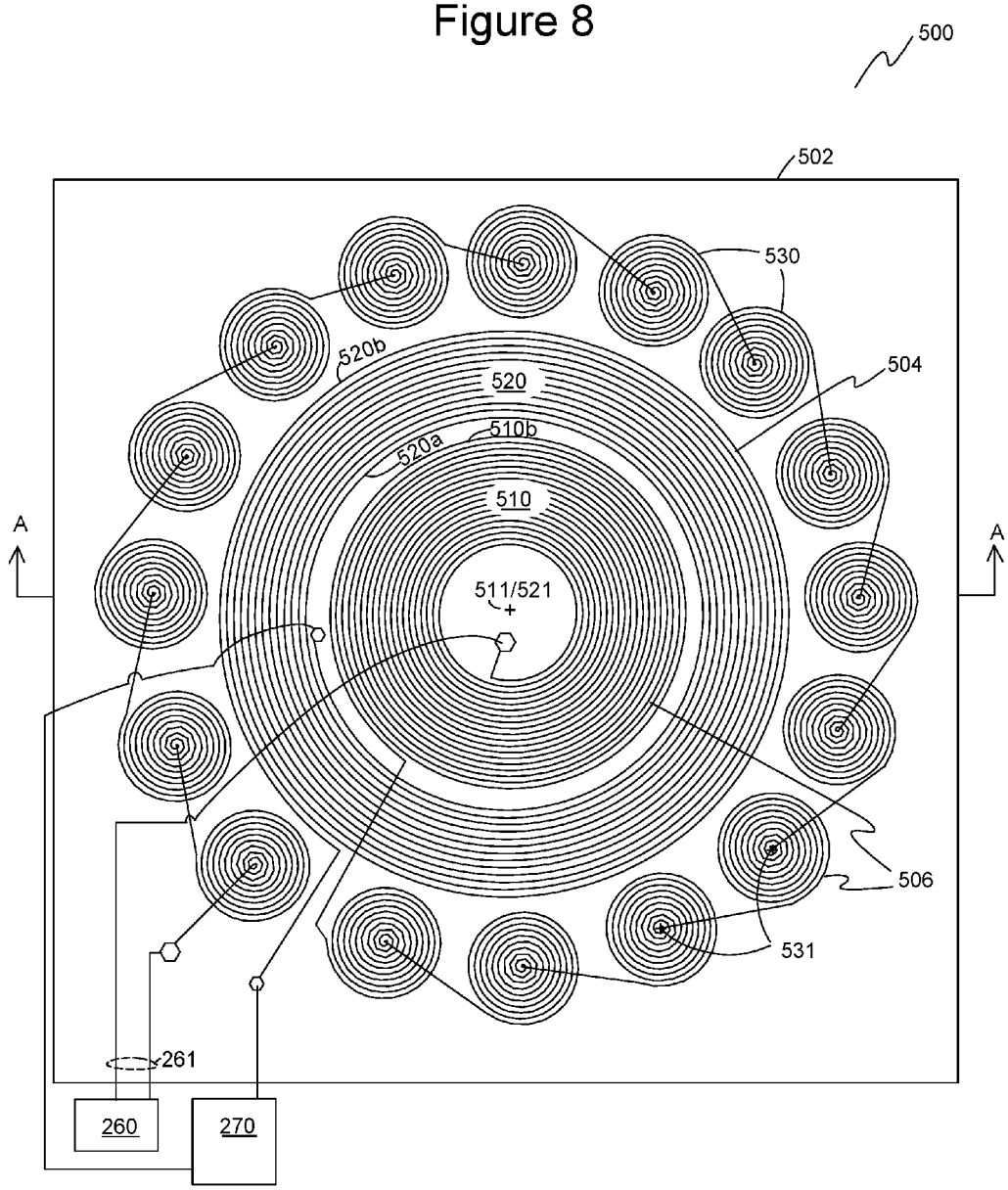
FIG. 8 is a plan view of one embodiment of a transceiver of the present invention showing a printed circuit board that includes an inner receive coil, a plurality of outer receive coils, and a transmit coil positioned radially between the inner receive coil and the outer receive coils.

FIG. 8 shows a plan view of one embodiment of a transceiver antenna 500 of the present invention useful as tag reader antenna 5 (shown in FIG. 1). Transceiver antenna 500 includes a transmit antenna 504 and a receive antenna 506. In one embodiment, transceiver antenna 500 has a substrate 502 upon which transmit antenna 504 and receive antenna 506 are disposed. For example, substrate 502 is a circuit board with transmit antenna 504 and receive antenna 506 disposed as conductive traces. Receive antenna 506 includes one or more inner receive coil(s) 510 and one or more outer receive coil(s) 530. The inner receive coil 510 is connected in series with the outer receive coils 530, which themselves are connected in series. Thus, all of the receive coils 510, 530 are connected in series.

In one embodiment as shown, receive antenna 506 has one inner receive coil 510 and a plurality of outer receive coils 530. In the embodiment shown, there are sixteen outer receive coils 530. One or more inner receive coils 510 are positioned within a transmit coil inner area circumscribed by transmit antenna 504. Here, innermost turn 520a defines the transmit coil inner area. A plurality of outer receive coils 530 are positioned outside of transmit antenna 504. For example, transmit coil 520 is positioned outside of an outermost turn 510b (e.g., outer diameter) of inner receive coil 510, inner receive coil 510 is positioned inside of an innermost turn 520a (e.g., inner diameter) of transmit coil 520, and outer receive coils 530 are positioned outside of an outermost turn 520b (e.g., outer diameter) of transmit coil 520. Inner receive coil 510 may be one or more coils.

In one embodiment, each of coils 510, 520, 530 has a circular or spiral shape. Other shapes are acceptable and coils 510, 520, 530 do not have to have the same shape. For example, coils 510, 520, 530 may be triangular, rectangular, polygonal, or other regular or irregular shapes provided that the shape has a closed or substantially closed geometry.

In some embodiments, such as shown in FIG. 8, transmit antenna 504 and receive antenna 506 are coplanar or substantially coplanar as is the case when disposed on a single face of a planar substrate 502, such as a printed circuit board. In use, transmit antenna 504 is connected to a transmitter 270 and receive antenna 506 is connected to a receiver 260 configured for receive voltage 261. In other embodiments, transmit antenna 504 and receive antenna 506 are disposed in parallel planes, such as when transmit coil 520 and receive coils 510, 530 are disposed on opposite, parallel faces of substrate 502 or when disposed on other structures. For example, coils 510, 520, 530 are made of wire wound on cylindrical substrates 502 and positioned to achieve the same functionality as when substrate 502 is a printed circuit board.

Figure 9:
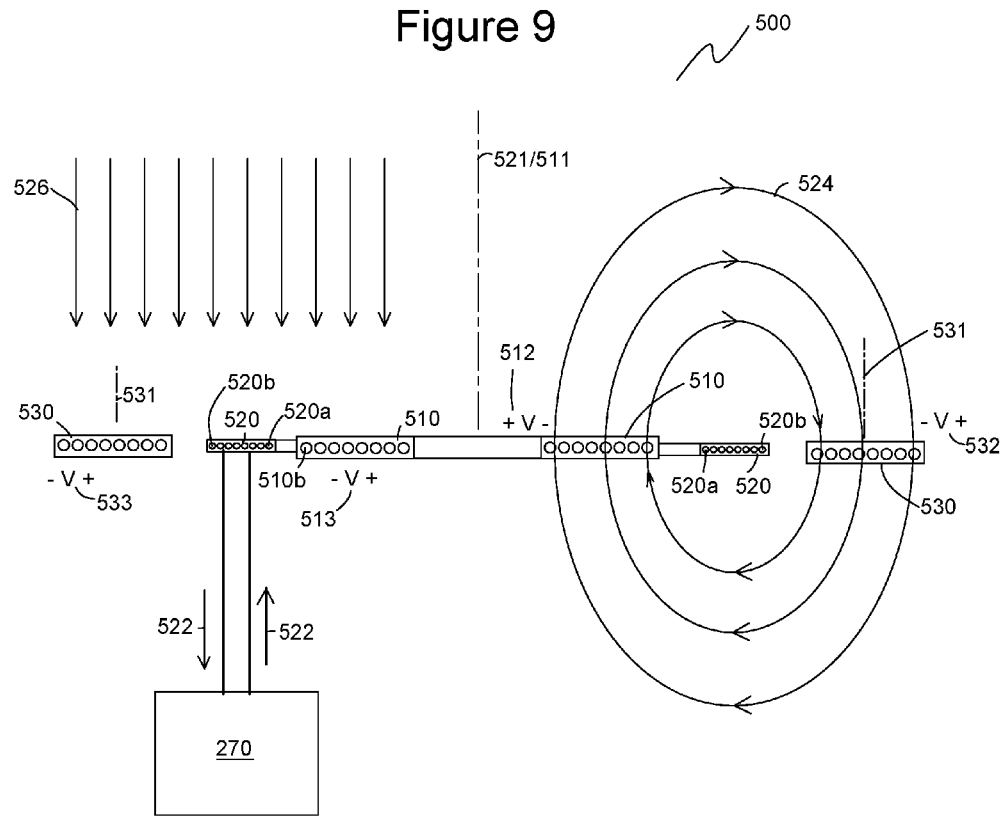
FIG. 9 is perspective diagram of the transceiver of FIG. 8 substantially taken along line A-A and illustrating the theory of operation of the transceiver.

Inner receive coil 510 has an inner receive coil axis 511, each outer receive coil 530 has an outer receive coil axis 531, and transmit coil 520 has a transmit coil axis 521, where axes 511, 521, 531 extend perpendicular to a plane of the respective coil (also shown in FIG. 9). In one embodiment, each inner receive coil axis 511, each outer receive coil axis 531, and transmit coil axis 521 are all parallel to one another. In some embodiments, inner receive coil axis 511 and transmit coil axis 521 are the same axis.

Receive coils 510, 530 and transmit coil 520 each have a closed or substantially closed shape, such as a circle, a rectangle, a triangle, or another shape. The term "substantially closed" acknowledges that for a coil with a plurality of concentric turns that spiral between a smaller innermost turn and a larger outermost turn, the adjacent turns do not overlap to close the shape. Thus, where one turn of the spiral shape passes the next turn, a substantially closed geometry is defined. Turns of coils 510, 520, 530 may be concentric (e.g., a planar coil), overlapping (e.g., wire wrapped in overlapping turns around a rod), or in a spiral configuration (e.g., wire wrapped in a spiral along a rod.)

FIG. 9 is a simplified sectional diagram illustrating the function of transceiver antenna 500 of FIG. 8 as viewed along line A-A. As noted above, an inner receive coil 510 is disposed inside the area circumscribed by innermost turn 520a of transmit coil 520 as viewed along transmit coil axis 521. Transmit coil axis 521 is the same as inner receive coil axis 511, but this does not have to be the case. A plurality of outer receive coils 530 are disposed outside of outermost turn 520b of transmit coil 520. Outer receive coils 530 have outer receive coil axis 531. When transmit coil 520 is active (i.e., powered by transmitter 270), a transmit loop current 522 conducted through transmit coil 520 generates a magnetic field 524 around transmit coil 520 according to Ampere's Law.

Illustrated on the right-side of FIG. 9, magnetic field 524 produced by the transmit coil 520 impinges on outer receive coil 530 in a downward direction to induce an outer receive coil voltage 532 in outer receive coil(s) 530. Magnetic field 524 impinges on inner receive coil 510 in an upward direction to induce an inner receive coil voltage 512 that is ~180° out of phase with outer receive coil voltage 532. It is understood that magnetic field 524 would be mirrored on the left side of FIG. 9 with similar effect, but is not shown in FIG. 9 for clarity. According to the right hand rule, transmitter magnetic field 524 will pass through the inner receive coil(s) 510 (upward) and the outer receive coil(s) 530 (downward) in substantially opposite directions relative to each other. Therefore, transmitter magnetic field 524 induces outer receive voltages 532 in outer receive coil(s) 530 and inner receive voltages 512 in inner receive coil(s) 510 that are out of phase with each other. By designing antenna 500 such that inner receive coil(s) 510 and outer receive coil(s) 530 are connected in series and produce the same magnitude of voltage (i.e., $\Sigma V_{512} = -\Sigma V_{532}$) when excited by the transmit coil 520, receiver 260 (shown in FIG. 8) sees no signal generated by transmit magnetic field 524 from receive antenna 506 (shown in FIG. 8) during transmission because inner receive voltages 512 from inner receive coil(s) 510 cancel outer receive voltages 532 from outer receive coil(s) 530 and vice versa. This phase cancellation results in inner receive coil(s) 510 being located within the area circumscribed by transmit coil 520 and outer receive coil(s) 530 being located outside of transmit coil 520.

To protect the circuitry of a receiver 260 (shown in FIG. 8), when transmit coil 520 generates a magnetic field, the sum of voltages induced in series-connected outer receive coils 530 substantially cancel the sum of voltages induced in inner receive coil(s) 510. In some embodiments, these voltages completely cancel each other or approximate zero when transmit coil 520 generates a magnetic field during transmission. Preferably, the phase cancellation results in attenuation by at least 99%. More preferably, phase cancellation results in attenuation of at least 99.4%. Phase cancellation of a smaller degree is also acceptable depending on the design of antenna 500 and the associated circuitry of transmitter 270 and receiver 260 (shown in FIG. 8).

For example, when the voltage induced in inner receive coil 510 is 100.0 v, the voltage induced in outer receive coils 530 is −99.4 v. Therefore, due to series connection of inner and outer receive coils 510, 530 and the opposite polarity or phase cancellation of the induced voltages, these voltages combine with 99.4% phase cancellation for a resulting receive signal 261 (shown in FIG. 8) of 0.6 v.

Figure 9A:
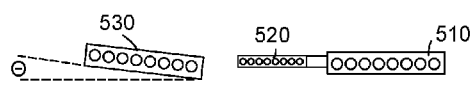
FIG. 9A is a sectional view of part of the transceiver of FIG. 8 showing an outer receive coil canted with respect to the transmit and inner receive coils.
Figure 9B:
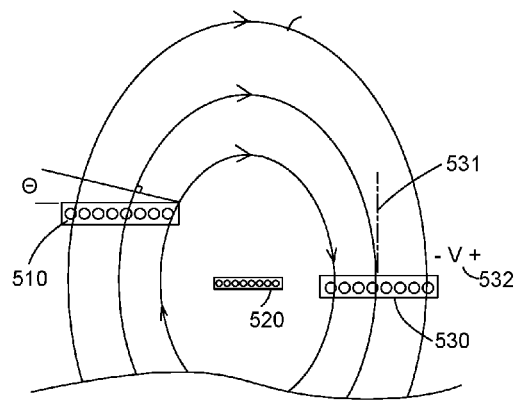
FIG. 9B is a sectional view of part of the transceiver of FIG. 8 showing an outer receive coil in a plane parallel to the transmit coil, where the effective area of the outer receive coil is reduced due to the angle of incidence of the magnetic field.

To achieve this result with coplanar transmit and receive antennas 504, 506 (shown in FIG. 8), the sum of areas enclosed by turns of the inner receive coil(s) 510 is equal to or approximately equal to the sum of areas enclosed by turns of the outer receive coil(s) 530. If, however, the plane of inner receive coil 510 or outer receive coil(s) 530 are canted at an angle θ (shown in FIG. 9A) with respect to the plane of transmit coil 520 the effective area of the canted receive coils 510 and/or 530 is reduced by multiplying by the cosine of the cant angle θ. Similarly, as shown in FIG. 9B, when one or more of receive coils 510, 530 are on a plane parallel to, but axially spaced apart from a plane containing transmit coil 520, the actual area of receive coils 510, 530 is also reduced to the effective area by multiplying by the cosine of angle θ.

For the purpose of this application, the "effective area" of a canted coil with cant angle θ>0 means the area of a hypothetical coil that is coplanar to the transmit coil 520 and that would produce the same output voltage as the canted coil, where the physical area of the hypothetical coil is less than the physical area of the canted coil. The effective area accounts for the magnetic field lines that may no longer impinge in a direction perpendicular to the receive coils 510, 530. Since the value of cos(θ) will be equal to 1 or less, the actual area of a coil may need to be similarly increased to compensate for cant angle θ to achieve the desired result. For 100% voltage cancellation, $V_{inner} + V_{outer} = 0$. While 100% voltage cancellation is ideal, other lesser amounts of cancellation are acceptable and depend on the particular design needs of the transceiver and associated circuitry. For example, phase cancellation of the inner and outer receive coils 510, 530 is used to attenuate the associated receiver voltage 261 (shown in FIG. 8) to be on the same order of magnitude as, below the noise floor of, or to a desired percentage of receiver voltage 261 (shown in FIG. 8) as measured by the RMS receiver input voltage of receiver 260 (shown in FIG. 8). Generally, it is desirable to be able to filter out or distinguish the receiver voltage 261 (shown in FIG. 8) associated with voltage induced in receiver coils 510, 530 by transmit coil 520.

Expressed in general mathematical terms, $$m1\Sigma_1^{n1} A_{inner} \cos(\Theta 1) = m2\Sigma_1^{n2} A_{outer} \cos(\Theta 2) \qquad (1)$$

where
- m1 is the number of outer receive coils 530 (e.g., m1=16);
- n1 is the number of turns in an outer receive coil 530 (e.g., n1=10);
- m2 is the number of inner receive coils 510 (e.g., m2=1);
- n2 is the number of turns in each inner receive coil (e.g., n2=20);
- A is the area enclosed by a single turn of a particular coil (for a circle, $A = \pi r^2$)
- $\Theta 1$ is the angle of cant between the inner receive coil plane and the transmit coil plane; and
- $\Theta 2$ is the angle of cant between the outer receive coil plane and the transmit coil plane.

In the event that outer receive coils 530 and inner receive coil(s) 510 are located in different planes, inner receive coil voltage 512 may be less than 180° out of phase with outer receive coil voltage 532; however, the general principle of phase cancellation still applies to reduce receiver voltage 261 (shown in FIG. 8) to an acceptable level for receiver 260 (shown in FIG. 8).

On the other hand, as illustrated in the left-hand side of FIG. 9, when an external magnetic field 526 (i.e., a magnetic field not generated by the collocated transmit coil 520 of transceiver antenna 500) impinges on inner receive coil 510 and on outer receive coil 530, inner receive voltages 513 and outer receive voltages 533 induced in the receive coils 510, 530, respectively, are in phase since none of receive coils 510, 530 is circumscribed by the external antenna coil generating external magnetic field 526. That is, no phase cancellation occurs since both the inner receive coils 510 and outer receive coils 530 are located outside of the external antenna coil (not shown) generating the external magnetic field 526. Also, external magnetic field 526 impinges on inner receive coil 510 and outer receive coil 530 in substantially the same direction (e.g., downward direction). Therefore, inner receive voltages 513 and outer receive voltages 533 are in phase and combine to provide a larger receiver voltage 261 to receiver 260 (shown in FIG. 8). As a result, the additive combination of in-phase receiver voltages 513, 533 effectively increases the sensitivity of the receiver antenna 506 (shown in FIG. 8) so that one may better receive a signal from a desired external magnetic field 526.

As appreciated by one of skill in the art, full cancellation of the coupling between transmit coil 520 and receive coil(s) 510, 530 becomes more difficult to achieve as the axial spacing between the coil planes is increased beyond one half of the transmit coil diameter. Also, when the lateral spacing between coils exceeds one to two times the diameter of transmit coil 520, it is very difficult to achieve full cancellation in a configuration that does not also cancel all or most of the external signal from external magnetic field 526 that is desired to be received.

Figure 10:
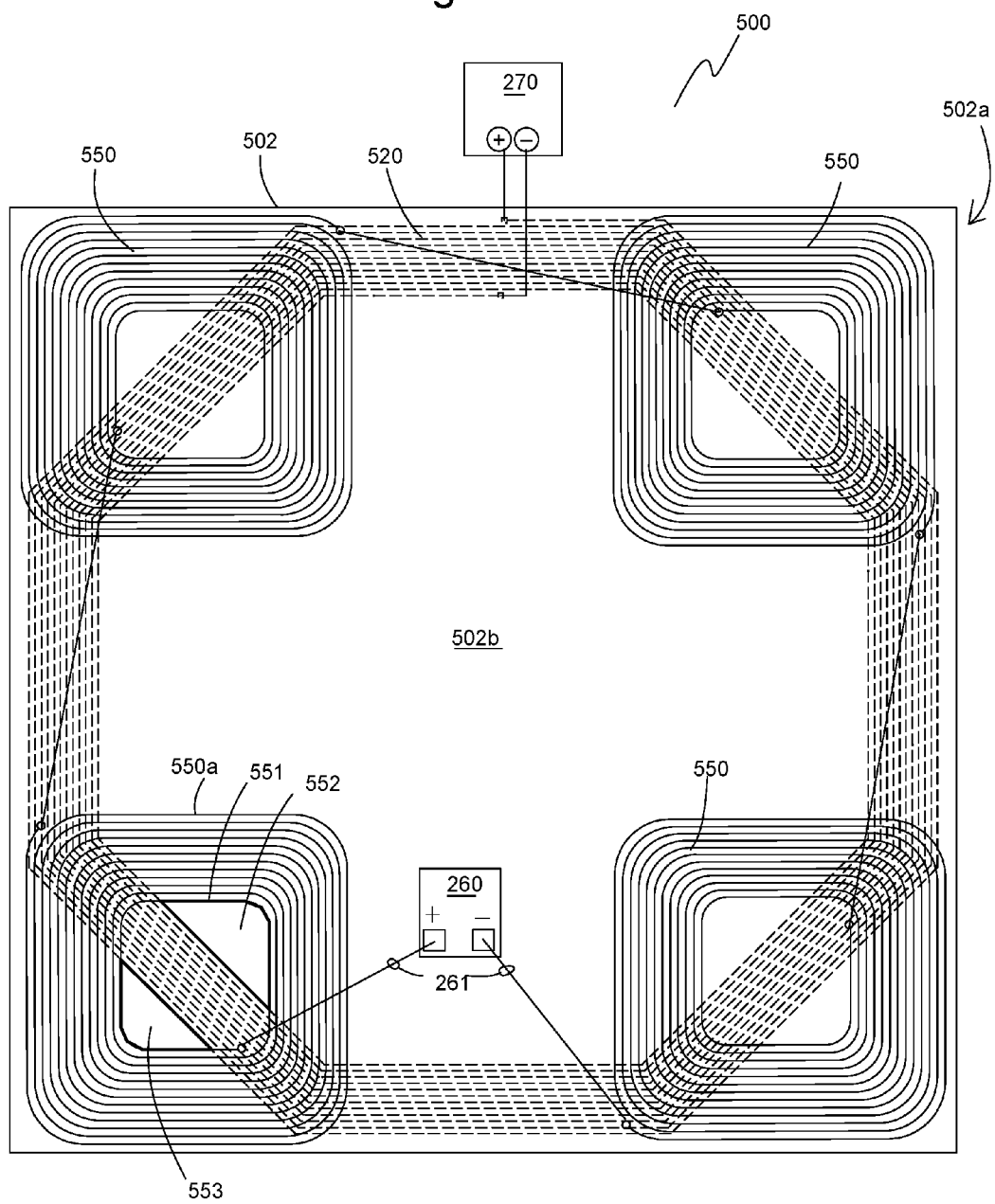
FIG. 10 is a plan view of another embodiment of a transceiver of the present invention showing a printed circuit board that includes an octagonal transmit antenna on one side of the circuit board and four receive antennas on the opposite side of the circuit board.

FIG. 10 shows a plan view of another embodiment of a transceiver antenna 500 of the present invention with transmit coil 520 and one or more receive coils 550. In one embodiment, substrate 502 is a printed circuit board, where transmit coil 520 and receive coils 550 are disposed as electrical traces on opposite sides of the printed circuit board. As shown in FIG. 10, transmit coil 520 has an octagonal shape with a plurality of turns that each define a substantially closed geometry. Transmit coil 520 is disposed on a first side 502a (back side) of printed circuit board 502 and coupled to transmitter 270. One or more receive coils 550 (e.g., four receive coils 550) are disposed on a second side 502b (front side) of the printed circuit board and connected in series. Each receive coil 550 has a plurality of turns that define a substantially closed geometry. As viewed in the plan view of FIG. 10, transmit coil 520 intersects each receive coil 550 so that the voltage induced in each receive coil 550 by the magnetic field from transmit coil 520 is partially or completely cancelled as a result of phase cancellation.

Since part of each receive coil 550 is inside the area enclosed by transmit coil 520 and part of each receive coil 550 is outside the area enclosed by transmit coil 520, the transceiver antenna 500 of FIG. 10 eliminates the need for distinct inner and outer receive coils. As discussed above with reference to FIG. 9, receive coils 550 in this embodiment are connected in series to increase the sensitivity of transceiver antenna 500 to desired signals impinging thereon. Considering the inner-most turn 551 of lower left receive coil 550a of receive coils 550 shown in FIG. 10, inner area 552 inside transmit coil 520 substantially equals outer area 553 located outside transmit coil 520. Among receive coils 550, inner areas 552 and outer areas 553 are sized so that voltage induced into receive coils 550 during transmission results in a zero (or near zero) receiver signal 261 at receiver 260. The phase cancellation during transmission, however, does not cancel voltage induced in receive coils 550 by an external magnetic field 526 generated by a transmitter distinct from transceiver antenna 500 (shown in FIG. 9.) Therefore, transceiver antenna 500 can transmit and receive at the same time with the same or different frequencies.

To achieve complete phase cancellation (or near-complete phase cancellation) in the embodiment of FIG. 10, the sum of the outer areas 553 of receive coils 550 that are located outside turns of transmit coil 520 need to be equal to (or substantially equal to) the sum of the inner areas 552 of receive coils 550 that are enclosed within turns of transmit coil 520. Transmit coil 520 and receive coils 550 in the embodiment of FIG. 10 can be any closed or substantially closed shape, including the square and octagonal shapes as shown.

Figure 11:
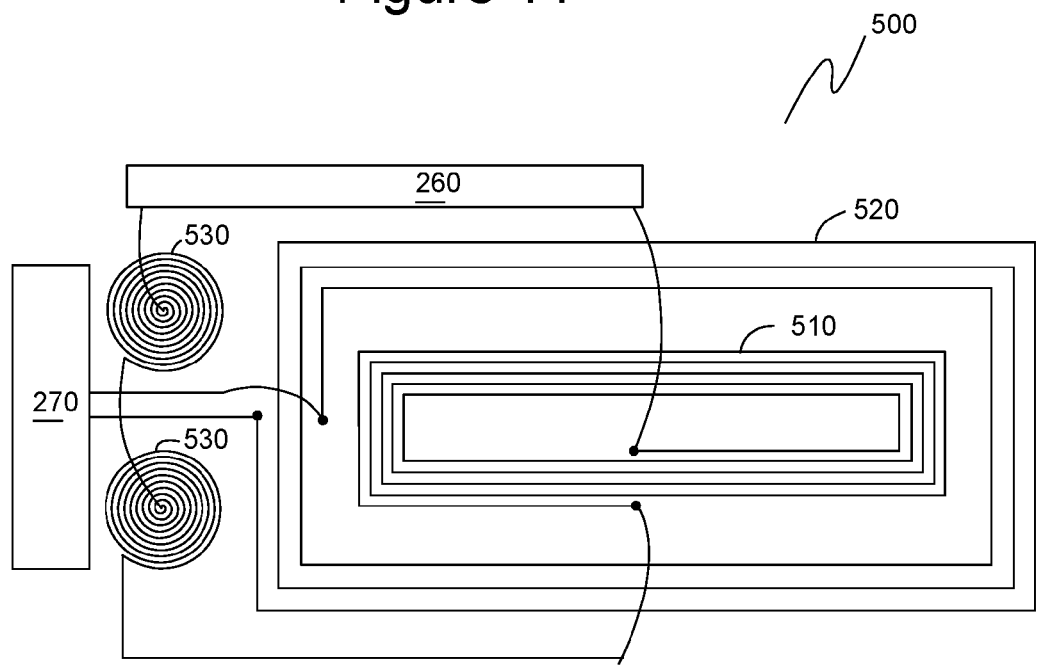
FIG. 11 is a perspective diagram of another embodiment of a transceiver of the present invention showing a transmit coil and receive coils positioned inside and outside of the transmit coil.

Referring now to FIG. 11, a plan view illustrates another embodiment of transceiver antenna 500 shown with inner receive coil 510 with a plurality of receive coil turns, transmit coil 520 with a plurality of transmit coil turns, and a plurality of outer receive coils 530 each of which has a plurality of outer receive coil turns. Inner receive coil 510 is connected in series with outer receive coils 530 and receiver 260. Transmit coil 520 is connected to transmitter 270. Each of inner receive coil 510, transmit coil 520, and outer receive coils 530 has a substantially closed geometric shape, where inner receive coil 510 is located within transmit coil 520. As with other embodiments, for substantially complete phase cancellation, the sum of the areas for turns of outer receive coils 530 is equal to or substantially equal to the sum of the areas for turns of inner receive coil 510.

Figure 12:
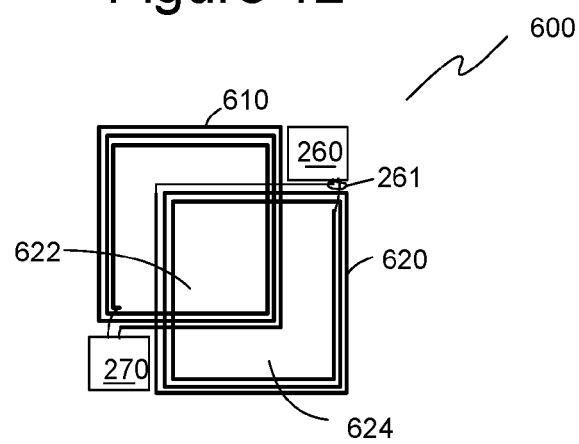
FIG. 12 is a plan view of another embodiment of a transceiver of the present invention showing a transmit coil and a receive coil, where the area of the receive coil that is inside the transmit coil is substantially equal to the area of the receive coil that is outside the transmit coil, thereby providing phase cancellation.

Referring now to FIG. 12, a plan view illustrates another embodiment of a transceiver antenna 600 coupled to receiver 260 and transmitter 270. Transmit coil 610 has a plurality of turns that each define a substantially closed geometry. Receive coil 620 has a plurality of turns that each define a substantially closed geometry. Transmit coil 610 and receive coil 620 are rectangular as illustrated, but other closed or substantially closed shapes are acceptable. Transmit coil 610 and receive coil 620 are located on closely-spaced parallel planes, such as opposite faces of a planar substrate 502 (shown in FIG. 10). Receive coil 620 is positioned to overlap transmit coil 610 to define an inner receive coil region 622 located within the closed geometry of transmit coil 610. Receive coil 620 also defines an outer receive coil region 624 located outside the closed geometry of transmit coil 610. Inner receive coil region 622 has an area equal to or substantially equal to the area of outer receive coil region 624 to the extent required for phase cancellation to reduce receive signal 261 to the desired signal level for receiver 260.

In one embodiment, the effective area of inner receive coil region 622 is 99%, 99.4% or 99.7% of the effective area of outer receive coil region 624 (or vice versa). Therefore, during transmission using transmit coil 610, a voltage induced into receive coil 620 by transmit coil 610 results in a zero or near zero signal from transmit coil 610 due to phase cancellation. As noted above, due to the phase cancellation of voltage induced by transmit coil 610, receive coil 620 may be used to receive signals from outside magnetic fields 526 (shown in FIG. 9) at the same time transmitter 270 is transmitting.

Figure 13:
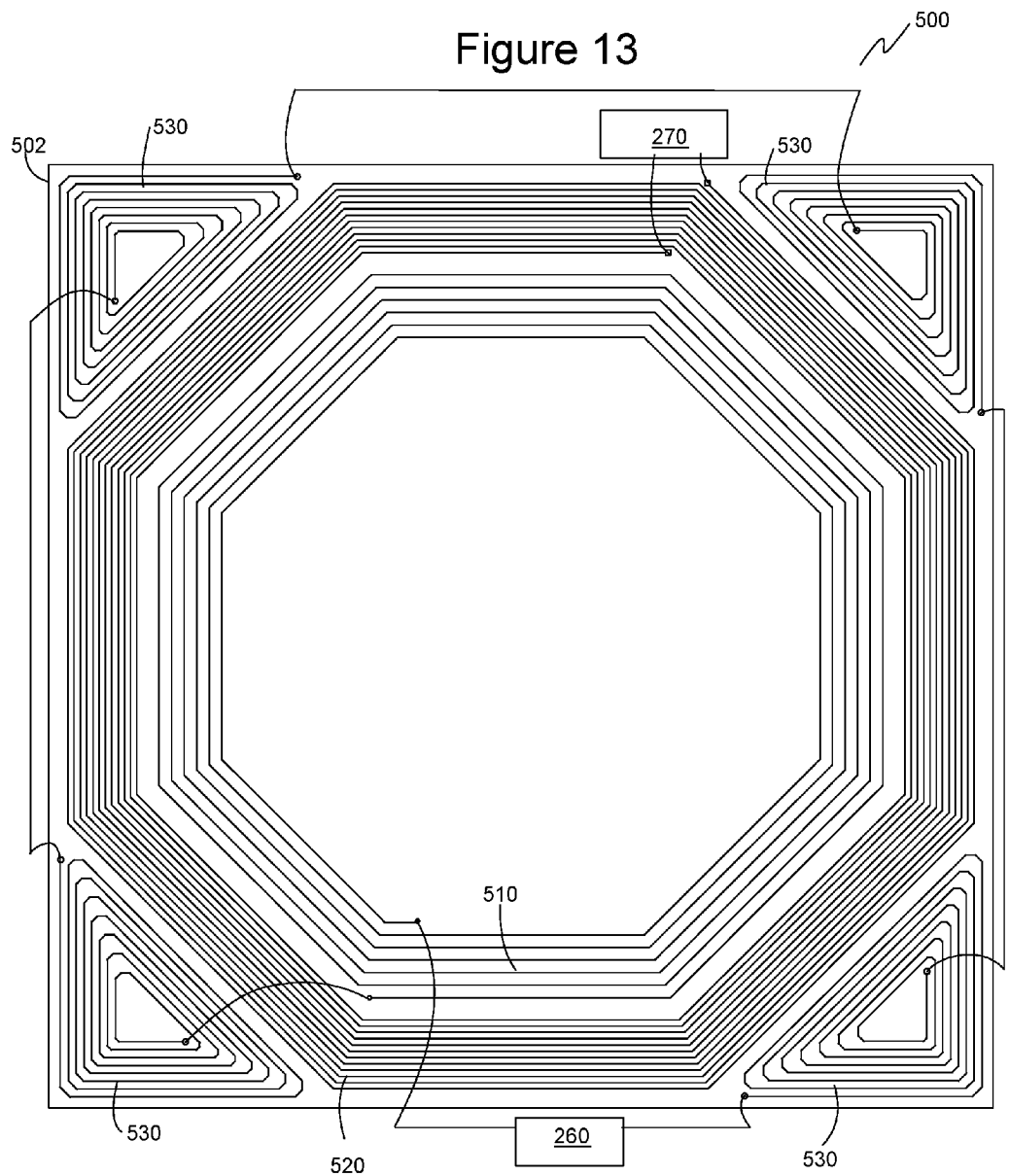
FIG. 13 is a plan view of another embodiment of a transceiver of the present invention showing an inner receive coil, a transmit coil, and a plurality of outer receive coils, where the inner and outer receive coils are connected in series.

Referring now to FIG. 13, a plan view illustrates another embodiment of a transceiver antenna 500. Similar to the embodiment of FIG. 8, transceiver antenna 500 of FIG. 13 includes transmit coil 520 with a plurality of turns that define substantially closed geometry. Inner receive coil 510 also has a plurality of turns each defining a substantially closed geometry. Inner receive coil 510 is located within the closed geometry of transmit coil 520. Located outside of transmit coil 520 are a plurality of outer receive coils 530 each having a plurality of turns that each define a substantially closed geometry. Outer receive coils 530 are connected in series with inner receive coil 510 and receiver 260. Transmit coil 520 is connected to transmitter 270. In one embodiment, transmit coil 520 and receive coils 510, 530 are coplanar on a substrate 502, such as a printed circuit board.

Figure 14:
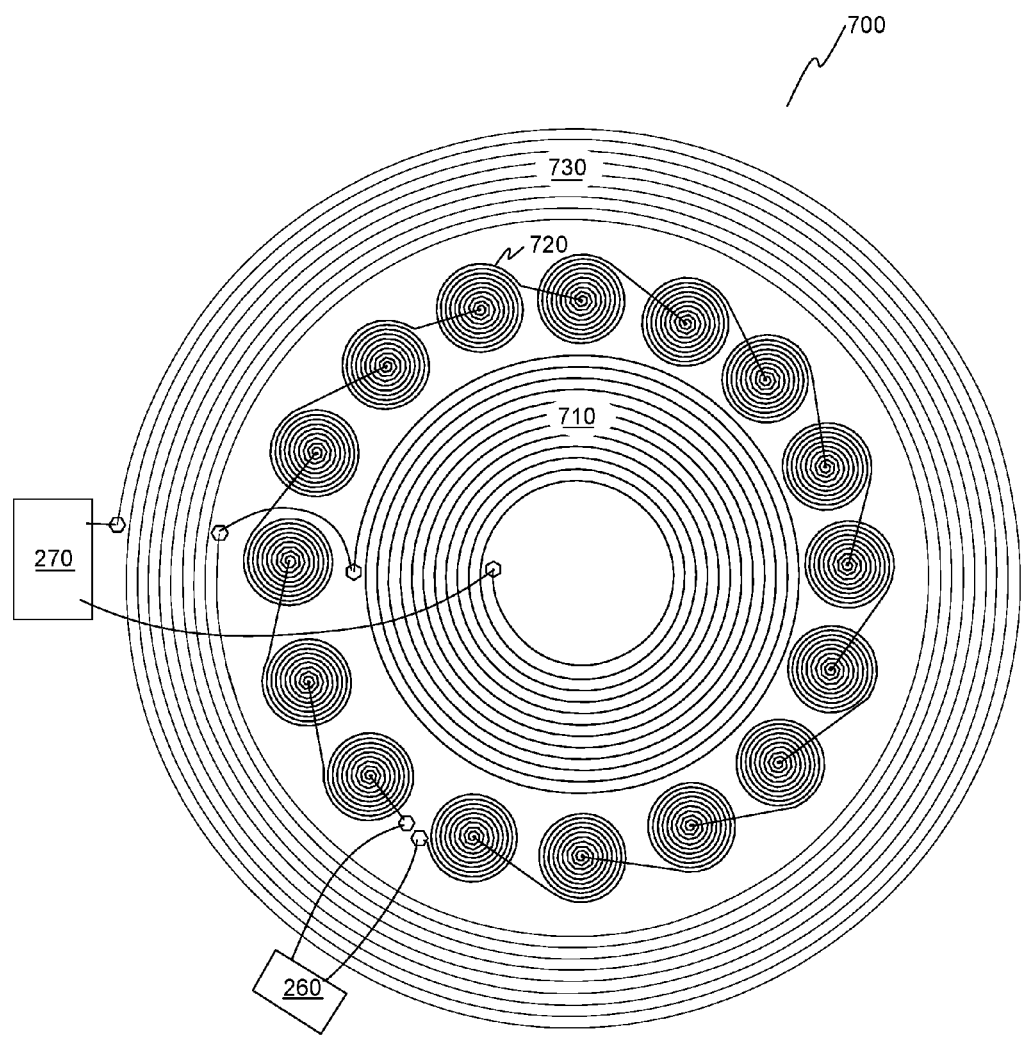
FIG. 14 is a plan view of another embodiment of a transceiver of the present invention showing a plurality of receive coils connected in series, an inner transmit coil, and an outer transmit coil, where the transmit coils are also connected in series and the receive coils are disposed radially between the inner transmit coil and the outer transmit coil.

Referring now to FIG. 14, a plan view shows another embodiment of transceiver antenna 700 with an inner transmit coil 710, a plurality of receive coils 720, and an outer transmit coil 730. Receive coils 720 are disposed outside of inner transmit coil 710 and within the area enclosed by outer transmit coil 730. Receive coils 720 each have a plurality of turns defining a substantially closed geometry. Receive coils 720 are connected in series with receiver 260. Inner transmit coil 710 is connected in series with outer transmit coil 730 and transmitter 270. A magnetic field generated by inner transmit coil 710 impinges on receive coils 720. Similarly, a magnetic field generated by outer transmit coil 730 impinges on receive coils 720. Due to the right-hand rule, the voltage induced in receive coils 720 by inner transmit coil 710 will be 180° out of phase with the voltage induced in receive coils 720 by outer transmit coil 730. Similar to embodiments of transceiver antenna 500, 600 discussed above, the sum of voltages induced in receive coils 720 cancel the voltages induced by inner and outer transmit coils 710, 730 due to being out of phase or of reverse polarity with each other.

In use, embodiments of transceiver antennas 500, 600, 700 of the present invention include collocated transmit antenna 504 and receive antenna 506 that utilize phase cancellation of voltages induced in the receive coils from a magnetic field generated by collocated transmit antenna 504. As a result, the receiver voltage 261 induced by the collocated transmitter coil 520 is reduced sufficiently due to phase cancellation to be received by receiver 260 so that it does not damage or overload receiver 260, can be filtered as noise from desired external signals, or both. Accordingly, transceiver antennas 500, 600, 700 of the present invention allow for simultaneous transmission and reception using the same frequency or using different frequencies.

During near-field communication, a transceiver antenna is provided that includes collocated transmit coils 520, 610, 710, 730 and receive coils 510, 620, 720 each defining a substantially closed geometry. The transmit coil circumscribes one or more areas of the receive coil(s). One or more additional areas are positioned outside of the geometry of the transmit coil. Thus, during transmit, voltage induced into the circumscribed areas of the series-connected receive coil(s) is attenuated by voltage induced into the one or more additional areas positioned outside of the geometry of the transmit coil. In some embodiments of the method, transmission is performed with a first frequency and reception is performed using a second frequency, where the first frequency and the second frequency may be the same or different frequencies. In some embodiments, phase cancellation is used to attenuate by at least 99% a signal induced into the receive coils by the collocated transmit coil.

With careful design and iterations to fine tune the precise voltages generated by the inner and outer receive coils 510, 530, cancellation approaching 100% can be achieved. Cancellation in excess of 99.5% can readily be attained even with standard production tolerances. The amount of cancellation required by a particular system depends on several system parameters, including (1) the relative strength of the signal being transmitted by the collocated transmit coil compared to the (desired)) signal being received from a remote system, (2) the limit of the absolute maximum input voltage to the receiver which would cause damage to the receiver or excessive electrical non-linearity in the signal path that would result in reception errors (e.g., receiver overload), (3) the required signal-to-noise-ratio (SNR) needed to achieve the desired bit-error-rate (BER), where the SNR is generally in the range of about 6 dB to 15 dB depending on the data coding scheme, (4) if different frequencies are used for transmission and reception then the selectivity of any RF filters used to reject the unwanted local transmitter frequency can compensate for less than 100% cancellation in the antenna, and (5) less cancellation in the antenna requires filters with higher selectivity which will add to the cost and size of equipment. When the transmit frequency and the receive frequency are the same or nearly the same, it may not be physically or economically possible in some cases to design a filter to separate them. Thus, phase cancellation can be used to achieve the desired system performance.

In embodiments discussed above, it is also possible to reverse the transmit antenna 504 with the receive antenna 506. Since mutual coupling is always reciprocal, either coil set can be used for transmit or receive. The choice of which coils are used for transmission and reception is determined by the configuration that most easily allows the optimum number of turns in the respective coils to achieve the best impedance match to the transmitter or receiver electronics. Generally, transmitters work best with lower impedance loads (therefore fewer coil turns) and receivers work best with higher impedance coils (requiring more turns) in order to generate the greatest signal voltage. However, it is not always necessary that the receiver coils 510, 530 have a higher impedance (greater effective number of turns) than the transmit coil 520.

Typical frequencies are between 100 kHz and 300 KHz or as limited by the physical dimensions of antenna 500, 600, 700. In some cases, for example, receive antenna 506 operates at 133 kHz while transmit antenna 504 operates at 215 kHz for communication distances on the order of tens of feet.

Transceiver antennas 500, 600, 700 of the present invention can be implemented, to collect data from attendees 2 at a venue, such as a trade show, casino, or other venue with attractions. Transceiver antennas 500, 600, 700 may also be used, for example, for secure communication, access control, and communications for miners. For example, transceiver antenna 500 is incorporated into a badge reader that communicates with an employee badge to allow access to secure facility areas.

Figure 15:
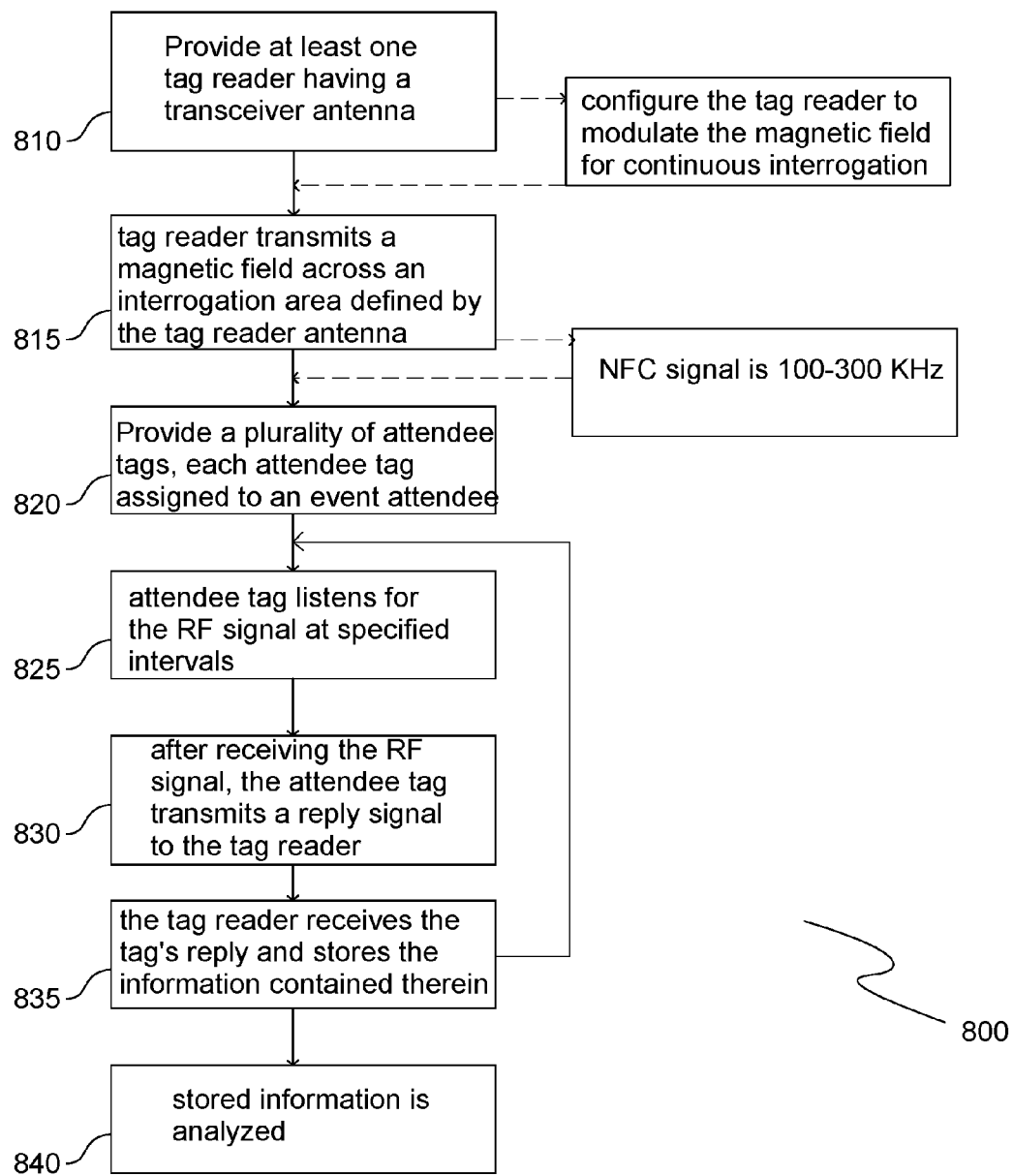
FIG. 15 is a flow chart illustrating steps of one embodiment of a method of collecting data of attendees at an event.

Referring now to FIG. 15 and with continued reference to the Figures discussed above, a flow chart illustrates steps of one method 800 of collecting attendee data. In step 810, at least one tag reader 1 is provided, where the tag reader 1 has a tag reader antenna 5. In some embodiments, the tag reader antenna 5 has transmitter coil(s) on the same plane or on a plane parallel to receiver coils, where a signal transmitted from the transmitter coils is substantially or completely canceled by phase cancellation in the receive antenna. In some embodiments, the tag reader 1 has three such coplanar or parallel plane antennas with the three antennas arranged along X, Y, and Z axes. Using an antenna of this type, the tag reader 1 is configured for continuous interrogation since the transmit and receive functions may be performed at the same time. This is unlike prior-art antennas that use a switch to alternate between transmission and reception to avoid damage to the receiver circuitry. In other embodiments, tag reader antenna 5 may just consist of a receive coil(s).

Optionally, step 810 includes modulating, by a RF tone detector 18, the RF initiator signal 130 in intensity, phase, and/or frequency. In one embodiment, RF initiator signal 130 is modulated using Amplitude-Shift Keying modulation. Other forms of modulation are acceptable, such as modulating phase and/or frequency.

In step 815, the tag reader 1 transmits a magnetic field across the open air of an interrogation area 46 defined by the tag reader antenna 5. In some embodiments, the magnetic field is modulated for continuous interrogation. In some embodiments, the magnetic field is transmitted from about 100 KHz to about 300 KHz; other frequencies are acceptable depending on the desired range and power level of the transmitter.

In step 820, a plurality of tags 2 are provided, where each tag 2 has a unique identifier or code. Optionally, tags 2 may each be assigned to a particular object 2*a*. Typically, an tag 2 may be encoded with a unique identifier code, but optionally is configured to transmit the attendee's name, company name, contact information, and/or other information useful to the user. Tags 2 in some embodiments have a tag antenna 15 configured for increased range and to enable the tag 2 in any orientation to receive a signal from magnetic field 130 transmitted by tag reader 1. In one embodiment of method 800, the tag reader antenna 5 is configured as a focused-beam antenna 40. In another embodiment of method 800, the tag reader antenna 5 is configured as an omnidirectional antenna.

In step 825, the tags 2 "listen" for signals as the object 2*a* moves about the venue. In one embodiment, each tag 2 periscopes at predefined intervals. Tags 2 may have different periscope intervals. In embodiments where tags 2 have the same periscope interval, the various tags 2 periscope at different times due to being started at different times. Therefore, tag reader 1 is able to communicate with a plurality of tags 2. In some embodiments, the tags 2 are configured to identify a modulated RF signal. As such, tags 2 can distinguish between a magnetic field transmitted from a tag reader 1 and other undesirable signals. In one embodiment, tags 2 demodulate a received RF signal.

In step 830, after receiving the magnetic field 130 while located in interrogation area 46 of tag reader 1, tag 2 transmits a reply tag signal 150 to the tag reader 1. In some embodiments, the X, Y, and Z planes of the tag reader antenna 5 enable the tag reader 1 to receive tag signals 150 from tags 2 that are positioned in any orientation.

In step 835, the tag reader 1 receives the tag signal 150 and stores the information in a data storage device 3, such as a database, or passes the information to another device.

Optionally, in step 840, data storage device 3 or other device determines the identity or other information associated with the tag 2 based on comparing the unique identifier value with a stored value. Data storage device 3 also records locations (e.g., booth number) and times of day that object 2*a* was present at the booth. Depending on the periscoping interval, the data collected may be, for example, a string of time stamps spaced by the periscoping interval and a location associated with each time stamp as available. When an object 2*a* is outside of range of any tag reader 1, no data is collected from the tag 2. The collected information may be analyzed and used as needed for marketing, predicting attendee behavior, identifying possible sales leads. In other variations on the method, the information is used to confirm the reported location of an attendee or to alert staff to the presence of an attendee entering an unauthorized area.

Figure 16:
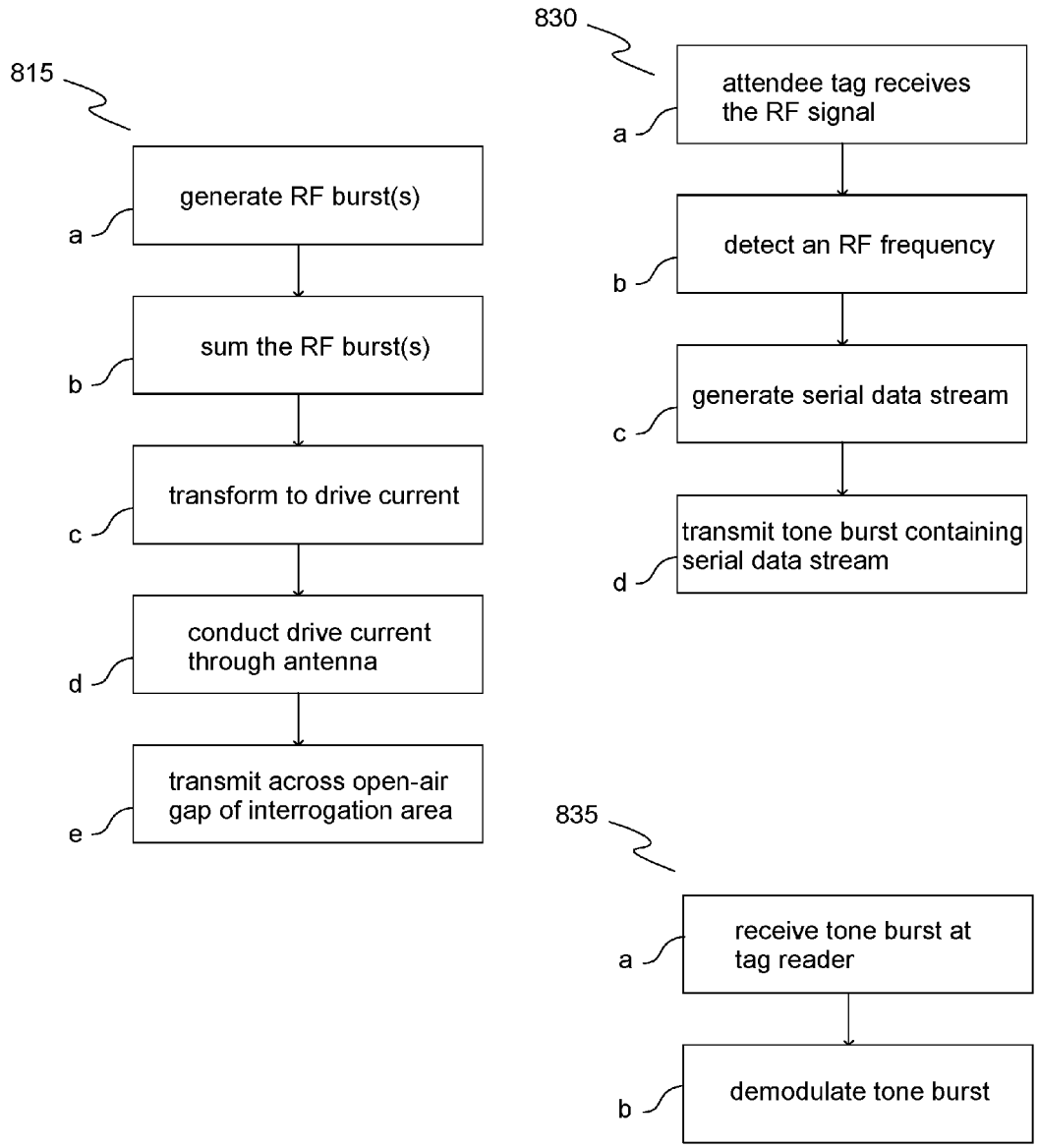
FIG. 16 is a flow chart illustrating additional steps of the method in FIG. 15.

Referring to FIG. 16, flow charts illustrate embodiments of steps 815, 830, and 835 of method 800. Step 815 includes sub-steps 815*a*-815*e*, step 830 includes sub-steps 830*a*-830*d*, and step 835 includes sub-steps 835*a*-835*b*.

In step 815*a*, tag reader 1 generates at least one RF burst 122. In step 815*b*, a summer 14 is used on the at least one RF burst 122 to produce a summed RF burst signal 124. In step 815*c*, a power amplifier 6 transforms the summed RF burst signal 124 into a drive current 126. In step 815*d*, the drive current 126 is conducted through the windings 43 of the tag reader antenna 5. In step 815*e*, an RF signal 130 is transmitted across interrogation field 46 via magnetic induction to at least one tag 2.

In step 830*a*, a tag 2 receives the RF signal 130 across the open air gap of interrogation field 46. The RF signal 130 may optionally contain a unique identifier comprising a sequence of real, imaginary, or complex numbers. Each tag 2 has a magnetic flux tag antenna 15 and at least one RF tone detector 18. Tone detectors 18 are demodulators that determine whether an incoming signal 133 represents a value of 1, 0 or a symbol.

In step 830*b*, each tag 2 detects a frequency of the RF signal 130. In step 830*c*, based on the frequency of the RF signal 130, a particular tag 2 generates a serial data stream 132 having a unique identifier corresponding to the particular tag 2. Step 830*c* of generating a serial data stream 132 may optionally include generating a plurality of RF bursts 134 in the tag 2 and amplifying the plurality of RF bursts 134 by a transmit power amplifier 17.

In step 830*d*, tag 2 transmits tag signal 150 that includes a tone burst 134 containing the serial data stream 132.

In step 835*a*, the tag reader 1 receives the tag signal 150 at a tag reader antenna 5. In step 835*b*, the tag reader 1 demodulates the tone burst 134 in tag signal 150 to provide a unique identifier value.

In one embodiment, method 800 may optionally include the step of amplifying the receiver tone burst 134 with an adjustable gain amplifier 17. Amplification may be done using an adjustable gain amplifier having one or more stages. The adjustable gain amplifier may utilize a voltage controlled resistor 25 in each of the gain stages.

In some embodiments, method 800 is performed with signals from about 100 KHz to about 300 KHz. In one embodiment of method 800, the magnetic field 130 and/or the tag signal 150 are between about 120 KHz and about 135 KHz.

In use, a tag reader 1 is positioned at a gateway, booth, or other location of interest in a venue. As an object 2*a* with the tag 2 approaches a booth, for example, tag reader 1 communicates with tag 2 via magnetic induction to identify the tag 2 and to record its location and time of day. Tag 2 may be a key fob, smart card, or other item with RF communication capability that may be identified using a sequence of numbers in tag signal 150 sent to tag reader 1.

In an example of system 100, each tag 2 has a unique code such as a serial number. Tags 2 may also store an object identifier code or value. Each tag 2 opens its receiver (i.e., periscopes) for a short time (~milliseconds) at a specified interval. When the tag 2 receives a query RF signal 130 from tag reader 1 (e.g., a box located in an area of interest), the tag 2 transmits tag signal 150 containing the object identifier code and serial number using Amplitude Shift Keying (ASK). This is done one bit at a time or as multi-bit symbols, depending on the particular implementation. Additional information can be stored in tag 2 and transmitted using ASK if requested by tag reader 1.

For example, if using FSK as a modulation scheme, system 100 may utilize four specific frequencies, one for each symbol. The desired symbol is sent from tag microcontroller 20 to RF burst generator 19, which sets the frequency of transmitted signal 134 to the correct frequency for the symbol. Tag reader 1 receives magnetic field 150 with frequency 150' and demodulates it back to the two bits. All of the data to be transmitted may be transmitted in this way, which requires significantly less time than transmitting the data one bit at a time.

As tag 2 is moved closer to the tag reader 1, signal strength increases. Amplifier inputs and outputs are monitored by each component's microcontroller 13, 20 and gain is increased or decreased depending on movement of the tag 2 relative to the tag reader 1. Typical output voltage from amplifiers 6, 7, 16, 17 is on the order of single millivolts, but depends on the level chosen by microcontrollers 13, 20.

Tag readers 1 and tags 2 use an agreed-upon ASK modulation scheme because it provides robust digital modulation of magnetic fields 130 and tag signals 150. RF tone detectors 9 of tag reader 1 demodulate incoming signal 116 and send detected tone 117 to tag reader microcontroller 13. Tag reader microcontroller 13 determines decodes detected tone 117 as a 1, 0, or a symbol. Similarly, tone detectors 18 in tag demodulate incoming signal 133 from amplifier 16. In one embodiment, tag reader antenna 5 is configured as directional magnetic flux antenna 5' and has at least 60 dB signal attenuation in directions outside of the specified angular region 108.

In one exemplary application of the present invention, system 100 is configured to collect event attendee data as shown, for example, in FIG. 1. For example, the system tracks Jean at a trade show or convention. The data shows that Jean visited booths 31, 32, and 33. Jean remained at booths 31 and 32 for ninety seconds each; Jean remained at booth 33 for twenty-eight minutes, twenty-six of those minutes at a particular display 33*a*. Collected data also shows that Jean returned to display 33*a* at booth 33 an hour later with Chris, the Director of Sales for Jean's company, and again two hours later with Pat, the company president.

The operator of booth 33 would then identify a potential customer in Jean's company and would have the information needed to follow up with Jean for further discussion.

In a variation on the use of system 100, tag readers 1 are placed inconspicuously around the various conference room entrances, thereby allowing data to be collected on the location of objects 2*a* holding tags 2 and the seminars each object 2*a* attended. Such a system can be used for tracking and verifying attendance at continuing education seminars or the like.

Yet another variation, system 100 is used to track guests at a casino. Each casino guest or object 2*a* is assigned and given a uniquely coded tag 2. Tag readers 1 are placed inconspicuously at the various gaming areas, thereby allowing data to be collected on the objects 2*a* who visited a particular gaming area and how long each attendee spent in the area. The collected data can be used by the casino to correlate guest information and demographics with gambling habits and use the results for the purpose of improving marketing and operations.

In yet another variation, system is used to track the location of wait staff at a restaurant for the purpose of measuring customer service and optimizing diner satisfaction. For example, each table is equipped with a tag reader 1 and each manager and waiter or waitress is an object 2*a* equipped with a tag 2. System records how often a manager or waiter/waitress visits each table, the duration of each visit, and other data. Analysis of the wait staff data in combination with other information such as tips, customer turnover frequency, orders received, and diner satisfaction enables the restaurant to adjust wait staff practices as needed to improve diner satisfaction, evaluate the effectiveness of promotions, and maximize profits.

Systems and methods of the present invention can be used in many other situations, including obtaining location data for cattle, employees, packages, luggage, deliveries, and the like.

Figure 17:
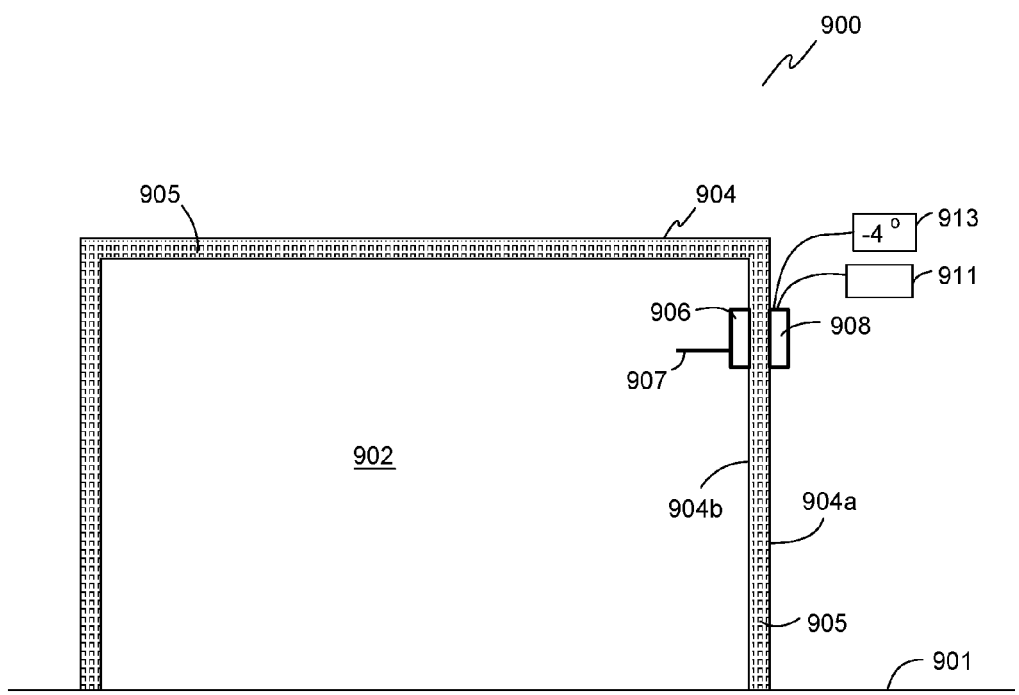
FIG. 17 illustrates one embodiment of a system for monitoring an environment within a shielding enclosure.

Turning now to FIG. 17, another aspect of the present invention is directed to a system 900 for monitoring an environment 902 enclosed partially or completely by an enclosure 904 made of shielding material. As used herein, the term "shielding material" means metal sheet, wire mesh, or other materials that block or significantly attenuate electromagnetic waves. In one embodiment, system 900 includes at least one transmitter 906 disposed in environment 902 that is at least partially surrounded by enclosure 904.

In one embodiment, enclosure 904 is made of a material that completely attenuates (blocks) or attenuates transmission of electromagnetic energy by 80 dB or more (e.g., 92 dB) between a transmitter 906 and a receiver 908 to a level where the signal amplitude is on the order of noise or below. Such an enclosure can be made of metal sheet or wire mesh. In one embodiment, environment 902 is enclosed by a wall 905 or walls 905. One example of enclosure 904 is a circular, polygonal, or other closed shape or substantially-closed shape (e.g., a C or U shape). Wall(s) 905 may include or not include a top and/or bottom.

In many embodiments, enclosure 904 is a three-dimensional rectangular structure such as a room, building, container, or the like. Any faces of enclosure 904 not occupied by metal are closed or blocked by the earth to prevent communication using radio waves. In other embodiments, enclosure 904 is a sphere, cylinder, cone, box, or other hollow three-dimensional shape that is completely closed on all sides by shielding material.

Typically, enclosure 904 is made of metal sheet or wire mesh. Wire mesh effectively blocks transmission of electromagnetic energy when the size of openings in the mesh is smaller than the wavelength of the electromagnetic energy. For system 900, transmitter 906 may be any embodiment of tag 2 discussed above and receiver 908 may be any embodiment of tag reader 1 discussed above.

In prior-art temperature-monitoring systems for walk-in refrigerators, for example, a wire passes through the wall of door seal of the refrigerator to a temperature sensor on the inside of the refrigerator. A wired connection is required since radio frequency waves are not effectively transmitted through the metal-lined walls 905. A sensor near the door of a refrigerator often has a wire that passes over the door's sealing gasket. Over time, the wire and/or the sealing gasket to the refrigerator is weakened by repeatedly opening and closing the door.

Passing a wire through wall 905 of enclosure 904 is problematic to the integrity of the enclosure and impractical in some situations, such as for liquid storage tanks. To overcome such problems, system 900 is configured to wirelessly transmit temperature, humidity, movement, pressure, flowrate, or any other condition of environment 902 using near-field magnetic induction to a receiver on the outside of enclosure 904.

Enclosure 904 that is made of metal or lined with metal functions as a Faraday cage to significantly attenuate electromagnetic energy by redirecting these signals to ground 901. For example, environment 902 is the inside space of a walk-in refrigerator (enclosure 904) with walls 905 lined with metal. In the case of RF communication, the metal lining of a refrigerator completely attenuates the RF signal. In contrast, the attenuation of a magnetic field is proportional to distance. The strength of a magnetic field is proportional to $\mu_0/r^3$, where r is the distance from the source and $\mu_0$ is the permeability. For air, $\mu_0=1.0$. Copper, iron steel, stainless steel, aluminum, water, concrete, wood and other materials have permeability values that have a negligible effect on magnetic field strength.

Thus, while an RF wave is completely attenuated by enclosure 904 made of a shielding material, a magnetic field is not. Since the strength of a magnetic field is primarily a function of distance, and to a small extent a function of the medium through which it passes, the magnetic field of near-field magnetic induction is not attenuated by metal, liquids, or other shielding materials nearly to the extent as occurs with electromagnetic energy such as radio waves. Thus, transmitter 906 is capable of effective wireless communication with receiver 908 through enclosure 904 using near-field magnetic induction.

In one embodiment of system 900, shielding enclosure 904 is a refrigerator or other temperature-controlled enclosure with metal-lined walls 905. The enclosure's 904 walls 905 (including the ceiling and/or floor) are typically made of sheet aluminum no thicker than ¼ inch. In some embodiments, walls 905 include an outer shield 904a and an inner shield 904b, where inner and outer shields 904a, 904b are separated by foam insulation, air, or other material. In other embodiments, enclosure 904 is a box truck, truck trailer for cargo, a tanker trailer, an oven, an oil tank, a fuel tank, a cargo container, or other structure surrounding environment 902 on all sides by metal.

A transmitter 906 is coupled to a sensor 907, where transmitter 906 and sensor 907 are disposed in environment 902 within enclosure 904. A receiver 908 located outside of enclosure 904 is coupled using wire or wirelessly to a network, modem, storage device, computer, display, database, data logger, or other device. For example, receiver 908 is coupled to a computer for storing temperature readings and to a display for communicating the condition of environment 902 to viewers. Transmitter 906 and receiver 908 are configured to communicate using near-field magnetic induction. In one embodiment, transmitter 906 and receiver 908 communicate using near-field magnetic induction with a frequency of 100-300 KHz. In some embodiments, transmitter 906 and receiver 908 are separated by the short distance through wall 905 of the shielded enclosure 904.

One example of system 900 in use is a walk-in freezer or cooler. Sensor 907 is a thermocouple connected to transmitter 906 located in environment 902 inside the freezer. Receiver 908 communicates with transmitter 906 via near-field magnetic induction. Receiver 908 is coupled to a computer 911 and to a display 913 for temperature. Computer 911 is programmed to communicate a message or alarm if the temperature of environment exceeds or falls below a set temperature or acceptable temperature range. Workers on the outside of the freezer can also see the temperature on the display 913, which may be color-coded. For example, temperatures within the user-set acceptable temperature range are displayed in green while temperatures outside the acceptable temperature range are displayed in red. The display may also flash or sound an audible alarm when the temperature is outside of the acceptable temperature range.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

The invention claimed is:

1. A system for collecting data about objects moving within a specified site:
   at least one tag reader disposed within a specified site and configured to transmit a magnetic field to an interrogation area within the specified location and extending at least two meters across an open-air gap, the at least one tag reader having a transceiver antenna comprising:
      a first antenna coil disposed on a planar substrate and substantially defining a first coil closed geometry with an innermost first coil turn and an outermost first coil turn;
      at least one second antenna coil disposed on the planar substrate within the innermost first coil turn and having a plurality of second coil turns each defining a substantially closed second coil geometry, wherein the at least one second antenna coil defines an effective second coil area; and
      at least one third antenna coil disposed on the planar substrate outside of the outermost first coil turn and having a plurality of third coil turns defining a substantially closed third coil geometry, wherein the at least one third antenna coil has an effective third antenna coil area;
      wherein the at least one third antenna coil is connected in series with the at least one second antenna coil and wherein the effective third antenna coil area differs from the effective second coil area by no more than 5%, thereby resulting in at least 95% phase cancellation between a second voltage induced in the at least one second antenna coil and a third voltage induced in the at least one third antenna coil when conducting a current through the first antenna coil; and a plurality of tags configured to wirelessly communicate with the at least one tag reader via near-field magnetic induction across an open air gap of at least 2 meters, wherein each of the plurality of tags is constructed to be carried by an object moving within the specified site, wherein when located within the interrogation area, each of the plurality of tags is configured to wirelessly communicate a unique identifier to the at least one tag reader via near-field magnetic induction.

2. The system of claim 1, wherein the first antenna coil is a transmitter antenna and wherein the at least one second antenna coil and the at least one third antenna coil comprise a receiver antenna.

3. The system of claim 1, wherein the first antenna coil is a receiver antenna and wherein the at least one second antenna coil and the at least one third antenna coil comprise a transmitter antenna.

4. The system of claim 1, wherein the effective third antenna coil area differs from the effective second coil area by no more than 1%, thereby resulting in at least 99% phase cancellation between the second voltage induced in the at least one second antenna coil and the third voltage induced in the at least one third antenna coil when conducting the current through the first antenna coil.

5. The system of claim 1, wherein the transceiver antenna is configured as a focused-beam directional antenna constructed and arranged to direct the magnetic field within a particular angular region to define the interrogation area.

6. The system of claim 1, wherein the magnetic induction has a frequency from 100 KHz to 300 KHz.

7. The system of claim 1, wherein the at least one tag reader is configured to transmit and receive at the same time.

8. A method of collecting location data from objects moving within a specified site comprising:
providing at least one tag reader with a tag reader antenna configured to receive signals via near-field magnetic induction across an open-air gap of at least two meters;
providing a plurality of tags configured to wirelessly communicate with the at least one tag reader via near-field magnetic induction across an open air gap of at least 2 meters;
the at least one tag reader listening for the tag signal transmitted by any one or more of the plurality of tags;
each of the plurality of tags transmitting a tag signal containing a unique identifier;
receiving a tag signal from a particular tag at the at least one tag reader;
demodulating the tag signal from the particular tag to determine the unique identifier associated with the particular tag; and
saving the unique identifier.

9. The method of claim 8, wherein the providing step includes selecting the tag reader with the tag reader antenna configured as a transceiver antenna capable of transmitting and receiving at the same time.

10. The method of claim 8, wherein the tag signal comprises a plurality of tag signals separated in time by a constant tag signal interval.

11. The method of claim 8, wherein the tag signal comprises a plurality of tag signals separated in time by a varying tag signal interval.

12. The method of claim 8, wherein the tag signal comprises a plurality of tag signals separated in time by a tag signal interval that is adjustable by a user.

13. The method of claim 8, wherein the magnetic induction has a frequency from 100 KHz to 300 KHz.

14. The method of claim 8, further comprising:
selecting the at least one tag reader configured to transmit a magnetic field to an interrogation area extending across an open-air gap of at least two meters;
the at least one tag reader transmitting the magnetic field to the interrogation area; and
at least one of the plurality of tags receiving the magnetic field.

15. The method of claim 14, wherein the tag reader antenna is configured as a directional antenna and the interrogation area is substantially constrained to a specific angular region.

16. The method of claim 8 further comprising equipping at least one object with one of the plurality of tags.

* * * * *